(12) United States Patent
Gohshi et al.

(10) Patent No.: US 9,734,563 B2
(45) Date of Patent: Aug. 15, 2017

(54) IMAGE PROCESSING APPARATUS AND IMAGE PROCESSING METHOD

(71) Applicant: KEISOKU GIKEN Co., Ltd., Yokohama-shi, Kanagawa (JP)

(72) Inventors: Seiichi Gohshi, Yokohama (JP); Jin Ogasawara, Yokohama (JP); Shinichiro Nakamura, Yokohama (JP); Keisuke Ohashi, Yokohama (JP)

(73) Assignee: KEISOKU GIKEN CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/913,802

(22) PCT Filed: Aug. 29, 2014

(86) PCT No.: PCT/JP2014/004451
§ 371 (c)(1),
(2) Date: Feb. 23, 2016

(87) PCT Pub. No.: WO2015/029450
PCT Pub. Date: Mar. 5, 2015

(65) Prior Publication Data
US 2016/0247265 A1 Aug. 25, 2016
US 2017/0116713 A9 Apr. 27, 2017

(30) Foreign Application Priority Data

Aug. 30, 2013 (JP) .................. 2013-180359

(51) Int. Cl.
*G06T 5/00* (2006.01)
*H04N 5/208* (2006.01)
*G06T 5/20* (2006.01)

(52) U.S. Cl.
CPC ............. *G06T 5/003* (2013.01); *G06T 5/20* (2013.01); *H04N 5/208* (2013.01)

(58) Field of Classification Search
CPC .......... G06T 5/003; G06T 2207/20192; H04N 1/4092
See application file for complete search history.

(56) References Cited

U.S. PATENT DOCUMENTS

| 4,825,297 | A | * | 4/1989 | Fuchsberger | ........ H04N 1/4092 348/606 |
| 8,339,421 | B2 | * | 12/2012 | Moriya | ................. G06T 3/4053 345/660 |
| 2011/0279730 | A1 | * | 11/2011 | Goshi | ..................... G06T 5/003 348/627 |

FOREIGN PATENT DOCUMENTS

EP   2624536 A1   8/2013
JP   H05-75313 B2  10/1993
(Continued)

OTHER PUBLICATIONS

Nov. 4, 2014, International Search Report issued in International Patent Application No. PCT/JP2014/004451.
(Continued)

*Primary Examiner* — Brian P Werner
(74) *Attorney, Agent, or Firm* — Kenja IP Law PC

(57) ABSTRACT

An image is sharpened by using a frequency component exceeding a Nyquist frequency. In particular, an image processing apparatus 100 of the disclosure herein for generating an output image by sharpening an input image includes a first nonlinear processing unit 101 configured to generate a first signal by carrying out nonlinear processing on an input image signal representing the input image, a sharpening processing block 102 configured to generate a second signal containing a frequency component higher than a frequency component contained in the first signal by carrying out sharpening processing on the first signal, and an
(Continued)

adder 103 configured to generate an output image signal representing the output image by adding the second signal to the input image signal.

21 Claims, 19 Drawing Sheets

(56) References Cited

FOREIGN PATENT DOCUMENTS

| | | |
|---|---|---|
| JP | H06-337933 A | 12/1994 |
| JP | 2007-336019 A | 12/2007 |
| JP | 2011-172002 A | 9/2011 |
| WO | 2007061207 A1 | 5/2007 |
| WO | 2010/140281 A1 | 12/2010 |
| WO | 2012/043407 A1 | 4/2012 |

OTHER PUBLICATIONS

S. Farsiu, D. Robinson, M. Elad, and P. Milanfar, "Fast and Robust Multi-frame Super-resolution", IEEE Transactions on Image Processing, vol. 13, No. 10, pp. 1327-1344, Oct. 2004.

Jun. 17, 2014, Notice of Reasons for Refusal issued by the Japan Patent Office in the corresponding Japanese Patent Application No. 2013-180359.

Nov. 11, 2014, Notice of Reasons for Refusal issued by the Japan Patent Office in the corresponding Japanese Patent Application No. 2013-180359.

Mar. 10, 2017, Extended European Search Report issued by the European Patent Office in the corresponding European Patent Application No. 14840900.6.

\* cited by examiner

Sin

S1

S2

Sin+Sout

Sin

S1

S2

Sin+Sout

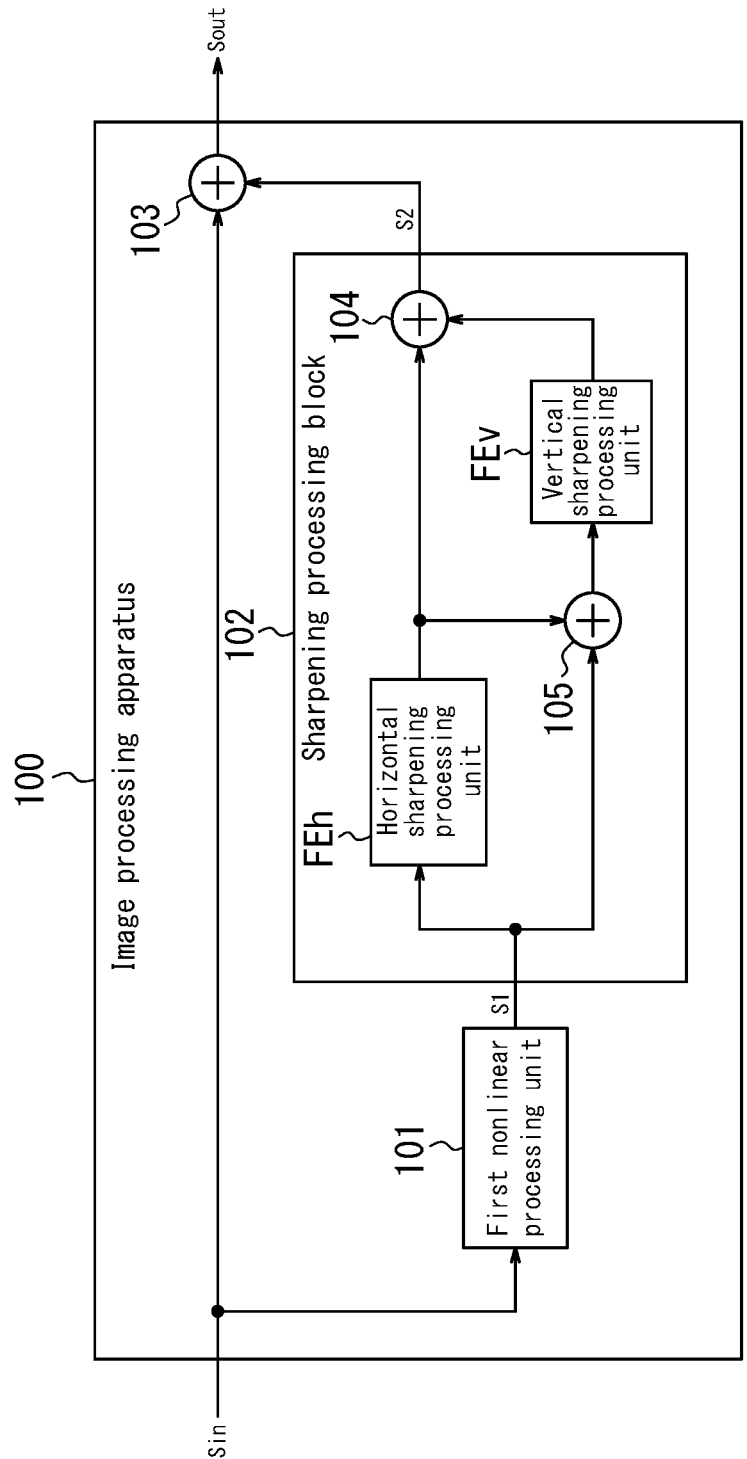

IMAGE PROCESSING APPARATUS AND IMAGE PROCESSING METHOD

CROSS REFERENCE TO RELATED APPLICATION

This application claims priority to and the benefit of Japanese Patent Application No. 2013-180359 (filed on Aug. 30, 2013), the entire contents of which are incorporated herein by reference.

TECHNICAL FIELD

This disclosure relates to an image processing apparatus and an image processing method those for improving image quality by sharpening an image and, for example, to an image processing apparatus and an image processing method those suitable for sharpening a video displayed in a television (TV) receiver in real time.

BACKGROUND

Conventionally, image enhancement processing for improving image quality by sharpening an image has been widely known. For example, a conventional television receiver carries out contour compensation for sharpening rising and falling of a video signal corresponding to an outline portion of an image to be displayed. The contour compensation extracts a high frequency component of an input image signal (a luminance signal), amplifies the high frequency component, and adds the amplified high frequency component to the input image signal, thereby improving visual image quality. FIG. 19 are diagrams illustrating changes in a waveform of a signal level of the image caused by the conventional image enhancement processing. FIG. 19A illustrates the waveform of the signal level in a horizontal direction of the input image signal, particularly illustrating a waveform of a portion corresponding to an edge where the signal level changes in the horizontal direction. FIG. 19B illustrates the high frequency component extracted from the input image signal. By amplifying the high frequency component and adding the amplified high frequency component to the input image signal, an output image signal with a sharp rising of the edge as illustrated in FIG. 19C may be obtained.

In recent years, also, there has been suggested a technique called super-resolution that up-converts, in particular, the input image into an output image with higher resolution and carries out the enhancement processing on the up-converted image (for example, see NPL 1 set forth below).

CITATION LIST

Non-Patent Literature

NPL 1: S. Farsiu, D. Robinson, M. Elad, and P. Milanfar, "Fast and Robust Multi-frame Super-resolution", IEEE Transactions on Image Processing, vol. 13, no. 10, pp. 1327-1344, October 2004.

SUMMARY

Technical Problem

Conventional image enhancement processing is based on linear digital signal processing and thus incapable of generating a frequency component higher than a Nyquist frequency, i.e., a frequency component higher than ½ of a sampling frequency of a subject image. Therefore, for improvement in image quality, image sharpening by generating and using the frequency component exceeding the Nyquist frequency cannot be carried out.

For example, when a full high-definition television (HDTV: High Definition Television, 1080×1920 pixels) receiver enlarges an image signal with resolution lower than that for the HDTV and displays an image thus obtained, the image becomes blur. Similarly, when an image represented by an image signal with resolution for the HDTV is enlarged to an image with higher definition (for example, 4K resolution of approximately 4000×2000 pixels), the image becomes blurry. A reason why the image becomes blur as described above is because the image signal subjected to the enlargement processing includes frequency components up to the Nyquist frequency of an original image before the enlargement alone and does not include a frequency component near the Nyquist frequency of the image after the enlargement.

The following is a description of a change in frequency components caused by enlargement and enhancement processing of the image, with reference to FIG. 20. FIG. 20A illustrates a frequency spectrum of a digital image signal with a sampling frequency fs, and FIG. 20B illustrates a frequency spectrum when the digital image signal is up-converted so as to double the number of pixels of the digital image signal in the horizontal direction. A new sampling frequency Fbs obtained through this processing is a double of the original sampling frequency fs (Fbs=2·fs). Here, as illustrated in FIG. 20B, in the up-converted digital image signal, there is no frequency component between the Nyquist frequency fs/2 corresponding to the original sampling frequency fs and a new Nyquist Fbs/2=fs corresponding to the new sampling frequency Fbs.

FIG. 20C illustrates a frequency spectrum when, on the up-converted digital image signal, image enhancement processing employing conventional linear digital signal processing is carried out. As illustrated in the figure, due to the image enhancement processing employing the linear digital signal processing, frequency components near the original Nyquist frequency fs/2 are increased. However, the image enhancement processing employing the conventional linear digital signal processing does not generate the frequency component exceeding the original Nyquist frequency fs/2. Therefore, the image enhancement processing by the conventional linear digital signal processing, as illustrated in FIG. 20D by way of example, does not generate a frequency component near a new Nyquist frequency Fbs/2 exceeding the original Nyquist frequency fs/2. That is, with the up-converted digital image signal, in order to improve the image quality, image sharpening by generating and using the frequency component exceeding the Nyquist frequency cannot be carried out.

Also, the conventional image enhancement processing, during the contour compensation, extracts a high frequency component from the input image signal itself, amplifies the high frequency component, and adds the amplified high frequency component to the input image signal. However, to an image with a dark input image signal or an image with low contrast, an effect of the image enhancement could be reduced.

Therefore, it could be helpful to provide an image processing apparatus and an image processing method capable of, even to an image with a dark input image signal and an image with low contrast, generating and using a frequency component exceeding a Nyquist frequency and thus effectively sharpening the image.

Solution to Problem

In order to solve the above problems, an image processing apparatus of the disclosure herein is an image processing apparatus for generating an output image by sharpening an input image, the image processing apparatus includes: a first nonlinear processing unit configured to generate a first signal by carrying out nonlinear processing on an input image signal representing the input image by using an upward-convex nonlinear function; a sharpening processing block configured to generate a second signal containing a frequency component higher than a frequency component contained in the first signal by carrying out sharpening processing on the first signal; and an adder configured to generate an output image signal representing the output image by adding the second signal to the input image signal.

In the image processing apparatus, preferably, the sharpening processing block has: a horizontal sharpening processing unit configured to generate a harmonic in a horizontal direction containing a frequency component higher than a frequency component in the horizontal direction contained in the input image signal; and a vertical sharpening processing unit configured to generate a harmonic in a vertical direction containing a frequency component higher than a frequency component in the vertical direction contained in the input image signal, and the horizontal sharpening processing unit and the vertical sharpening processing unit are connected in series or in parallel.

In the image processing apparatus, preferably, at least one of the horizontal sharpening processing unit and the vertical sharpening processing unit has: a filter configured to remove at least a DC component of a frequency component contained in an input signal; a nonlinear arithmetic unit configured to carry out, on an output signal of the filter, nonlinear processing that is asymmetric in a positive region and a negative region of the output signal of the filter, the nonlinear processing applied to the positive region and the nonlinear processing applied to the negative region being represented by a continuous function passing through an origin, such that a band of frequency components generated by the nonlinear processing becomes asymmetric in the positive region and the negative region; and a limiter configured to adjust an output signal of the nonlinear arithmetic unit.

In the image processing apparatus, preferably, at least one of the horizontal sharpening processing unit and the vertical sharpening processing unit has: a nonlinear arithmetic unit configured to carry out nonlinear processing on an input signal, such that an output signal of the nonlinear arithmetic unit to the input signal is represented by a continuous nonlinear function and a frequency component not contained in the input signal is generated; a filter configured to remove at least a DC component of a frequency component contained in the output signal of the nonlinear arithmetic unit; and a limiter configured to adjust an output signal of the filter.

The image processing apparatus preferably has an amplifier connected to a subsequent stage of one of the horizontal sharpening processing unit and the vertical sharpening processing unit and a preceding stage of the other.

In the image processing apparatus, preferably, an amplification factor $\beta$ of the amplifier satisfies $0 \le \beta \le 1$.

In order to solve the above problems, an image processing apparatus of the disclosure herein is an image processing apparatus for generating an output image by sharpening an input image, the image processing apparatus includes: a first nonlinear processing unit configured to generate a first signal by carrying out nonlinear processing on an input image signal representing the input image; a sharpening processing block configured to generate a second signal containing a frequency component higher than a frequency component contained in the first signal by carrying out sharpening processing on the first signal; and an adder configured to generate an output image signal representing the output image by adding the second signal to the input image signal, wherein the sharpening processing block has: a two-dimensional HPF configured to remove at least a DC component of frequency components in a horizontal direction and a vertical direction contained in the input image signal; a nonlinear arithmetic unit configured to carry out, on an output signal of the two-dimensional HPF, nonlinear processing that is asymmetric in a positive region and a negative region of the output signal of the two-dimensional HPF, the nonlinear processing applied to the positive region and the nonlinear processing applied to the negative region being represented by a continuous function passing through an origin, such that a band of frequency components generated by the nonlinear processing becomes asymmetric in the positive region and the negative region; and a limiter configured to adjust an output signal of the nonlinear arithmetic unit.

In order to solve the above problems, an image processing apparatus of the disclosure herein is an image processing apparatus for generating an output image by sharpening an input image, the image processing apparatus includes: a first nonlinear processing unit configured to generate a first signal by carrying out nonlinear processing on an input image signal representing the input image; a sharpening processing block configured to generate a second signal containing a frequency component higher than a frequency component contained in the first signal by carrying out sharpening processing on the first signal; and an adder configured to generate an output image signal representing the output image by adding the second signal to the input image signal, wherein the sharpening processing block has: a nonlinear arithmetic unit configured to carry out nonlinear processing on an input image signal, such that an output signal of the nonlinear arithmetic unit to the input image signal is represented by a continuous nonlinear function and a frequency component not contained in the input image signal is generated; a two-dimensional HPF configured to remove at least a DC component of frequency components in a horizontal direction and a vertical direction contained in an output signal of the nonlinear arithmetic unit; and a limiter configured to adjust an output signal of the two-dimensional HPF.

The image processing apparatus preferably further has a second nonlinear processing unit configured to carry out nonlinear processing on the input image signal representing the input image, wherein the adder generates an output image signal representing the output image by adding the second signal to a signal processed by the second nonlinear processing unit.

The image processing apparatus preferably has a two-dimensional LPF at a preceding stage or a subsequent stage of the first nonlinear processing unit.

In order to solve the above problems, an image processing apparatus of the disclosure herein is an image processing apparatus for generating an output image by sharpening an input image, the image processing apparatus includes: a horizontal direction processing unit having: a first nonlinear processing unit configured to carry out nonlinear processing on an input signal by using an upward-convex nonlinear function; a horizontal sharpening processing unit disposed at a subsequent stage of the first nonlinear processing unit, the horizontal sharpening processing unit configured to generate a harmonic in a horizontal direction containing a frequency component higher than a frequency component in the horizontal direction contained in the input signal; and a first adder configured to combine the input signal to the first nonlinear processing unit disposed at a preceding stage of the horizontal sharpening processing unit and an output signal of the horizontal sharpening processing unit; and a vertical direction processing unit having: a first nonlinear processing unit configured to carry out nonlinear processing on the input signal by using the upward-convex nonlinear function; a vertical sharpening processing unit disposed at a subsequent stage of the first nonlinear processing unit, the vertical sharpening processing unit configured to generate a harmonic in a vertical direction containing a frequency component higher than a frequency component in the vertical direction contained in the input signal; and a second adder configured to combine the input signal to the first nonlinear processing unit disposed at a preceding stage of the vertical sharpening processing unit and an output signal of the vertical sharpening processing unit, wherein the horizontal direction processing unit and the vertical direction processing unit are connected in series to process an input image signal.

In order to solve the above problems, an image processing method of an image processing apparatus for generating an output image by sharpening an input image, wherein procedure performed by the image processing apparatus has: (a) a step of generating a first signal by carrying out nonlinear processing on an input image signal representing the input image by using an upward-convex function; (b) a step of generating a second signal containing a frequency component higher than a frequency component contained in the first signal by carrying out sharpening processing on the first signal; and (c) a step of generating an output image signal representing the output image by adding the second signal to the input image signal.

In the image processing method, preferably, the step (b) has: a horizontal direction processing step of generating a harmonic in a horizontal direction containing a frequency component higher than a frequency component in the horizontal direction contained in the input image signal; and a vertical direction processing step of generating a harmonic in a vertical direction containing a frequency component higher than a frequency component in the vertical direction contained in the input image signal, and the horizontal direction processing step and the vertical direction processing step are carried out in series or in parallel.

In the image processing method, preferably, at least one of the horizontal direction processing step and the vertical direction processing step has: a DC component removal step of generating a signal by removing at least a DC component of a frequency component contained in an input signal; a nonlinear processing step of generating a signal by carrying out, on a signal generated at the DC component removal step, nonlinear processing that is asymmetric in a positive region and a negative region of the signal generated at the DC component removal step, the nonlinear processing applied to the positive region and the nonlinear processing applied to the negative region being represented by a continuous function passing through an origin, such that a band of frequency components generated by the nonlinear processing becomes asymmetric in the positive region and the negative region; and an adjustment step of generating a signal by adjusting a signal generated at the nonlinear processing step.

In the image processing method, preferably, at least one of the horizontal direction processing step and the vertical direction processing step has: a nonlinear processing step of generating a signal by carrying out nonlinear processing on an input signal, such that the signal generated at the nonlinear processing step to the input signal is represented by a continuous nonlinear function and a frequency component not contained in the input signal is generated; a DC component removal step of generating a signal by removing at least a DC component of a frequency component contained in the signal generated at the nonlinear processing step; and a step of generating a signal by adjusting the signal generated at the DC component removal step.

The image processing method preferably has a step of adjusting, based on an amplification factor $\beta$, a ratio to select between series execution and parallel execution of the horizontal direction processing step and the vertical direction processing step.

In the image processing method, preferably, the amplification factor $\beta$ satisfies $0 \leq \beta \leq 1$.

In order to solve the above problems, an image processing method of an image processing apparatus for generating an output image by sharpening an input image, wherein procedure performed by the image processing apparatus has: (a) a step of generating a first signal by carrying out nonlinear processing on an input image signal representing the input image; (b) a step of generating a second signal containing a frequency component higher than a frequency component contained in the first signal by carrying out sharpening processing on the first signal; and (c) a step of generating an output image signal representing the output image by adding the second signal to the input image signal, and the step (b) has: a DC component removal step of removing at least a DC component of frequency components in a horizontal direction and a vertical direction contained in the input image signal; a nonlinear processing step of generating a signal by carrying out, on a signal generated at the DC component removal step, nonlinear processing that is asymmetric in a positive region and a negative region of the signal generated at the DC component removal step, the nonlinear processing applied to the positive region and the nonlinear processing applied to the negative region being represented by a continuous function passing through an origin, such that a band of frequency components generated by the nonlinear processing becomes asymmetric in the positive region and the negative region; and an adjustment step of generating a signal by adjusting the signal generated at the nonlinear processing step.

In order to solve the above problems, an image processing method of an image processing apparatus for generating an output image by sharpening an input image, wherein procedure performed by the image processing apparatus has: (a) a step of generating a first signal by carrying out nonlinear processing on an input image signal representing the input image; (b) a step of generating a second signal containing a frequency component higher than a frequency component contained in the first signal by carrying out sharpening processing on the first signal; and (c) a step of generating an output image signal representing the output image by adding the second signal to the input image signal, and the step (b) has: a nonlinear processing step of generating a signal by carrying out nonlinear processing on an input image signal, such that the signal generated at the nonlinear processing step to the input image signal is represented by a continuous nonlinear function and a frequency component not contained in the input image signal is generated; a DC component removal step of generating a signal by removing at least a DC component of frequency components in a horizontal direction and a vertical direction contained in the signal generated at the nonlinear processing step; and a step of generating a signal by adjusting the signal generated at the DC component removal step.

The image processing method preferably further has (d) a step of carrying out nonlinear processing on an input image signal representing the input image, wherein the step (c) generates the output image signal representing the output image by adding the second signal to a signal generated at the step (d).

In the image processing method, preferably, the step (a) carries out the nonlinear processing after passing the input image signal through a two-dimensional LPF.

Advantageous Effect

Our image processing apparatus and image processing method are capable of, even to an image with a dark input image signal and an image with low contrast, generating a frequency component exceeding a Nyquist frequency, thereby effectively sharpening the image.

BRIEF DESCRIPTION OF THE DRAWINGS

In the accompanying drawings:

FIG. 8 is a diagram illustrating a configuration of an image processing apparatus according to a first embodiment;

DETAILED DESCRIPTION

Hereinafter, embodiments of the disclosure herein will be described in detail with reference to the accompanying drawings.

An image processing apparatus (an integrated circuit) according to each embodiment, schematically speaking, is an apparatus for carrying out sharpening processing for sharpening an image on a frequency component in a horizontal direction (a transverse direction, a main scanning direction) of the image and a frequency component in a vertical direction (a longitudinal direction, a sub-scanning direction).

The sharpening processing carried out by the image processing apparatus is an operation for carrying out nonlinear arithmetic processing on a signal representing an input image (hereinafter, referred to as an "input image signal"), thereby sharpening (enhancing) rise and fall of a signal corresponding to an outline portion (an edge) contained in the input image. The sharpening processing carried out by the image processing apparatus is capable of adding, to an image signal, a high frequency component which cannot be used by conventional sharpening processing that employs linear processing such as amplification processing and the like, thereby highly (intensely) sharpening the image.

First, an outline of a sharpening processing unit, which is a main element of the image processing apparatus according to each embodiment described later, will be described. Note that the sharpening processing unit may be either one of a horizontal sharpening processing unit and a vertical sharpening processing unit described later. A term "sharpening processing unit" will be used herein when it is not necessary to distinguish between the horizontal sharpening processing unit and the vertical sharpening processing unit.

(Example of First Configuration of Sharpening Processing Unit)

Figure 1:
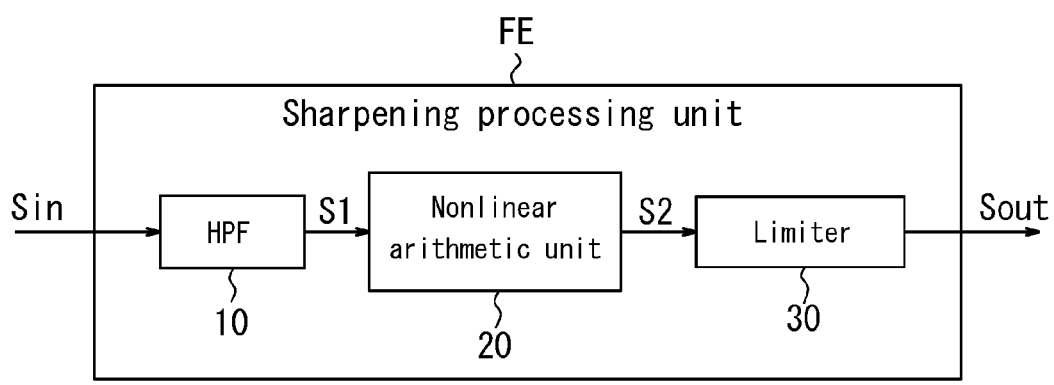
FIG. 1 is a diagram illustrating a first configuration of a sharpening processing unit of the disclosure herein.

FIG. 1 is a block diagram illustrating an example of a first configuration of a sharpening processing unit FE of the disclosure herein. The sharpening processing unit FE carries out, on an input image signal $S_{in}$ (or an input signal subjected to nonlinear processing or the like) that is externally input and serves as a digital signal representing an image, processing for sharpening the image represented by the input image signal $S_{in}$. The sharpening processing unit FE includes a HPF (High Pass Filter) 10, a nonlinear arithmetic unit 20 (an asymmetric nonlinear function), and a limiter 30.

The image represented by the input image signal $S_{in}$ may be either a still image or a video. When the input image signal $S_{in}$ represents the video, the video may be displayed in real time in, for example, a standard definition television (SDTV: Standard Definition Television) receiver or a high definition television (HDTV: High Definition Television) receiver.

The following is, by using a horizontal direction waveform of a signal level (a luminance value) of the image illustrated in FIG. 2 by way of example, a description of an operation of each element and a waveform output therefrom. Note that, although in the following each element will be described in association with the horizontal direction waveform of the signal level of the image, the sharpening processing similar to that for the horizontal direction waveform of the signal level may be carried out also on an a vertical direction waveform of the signal level of the image and a waveform of a signal level in a time direction between images of the video.

Figure 2A:
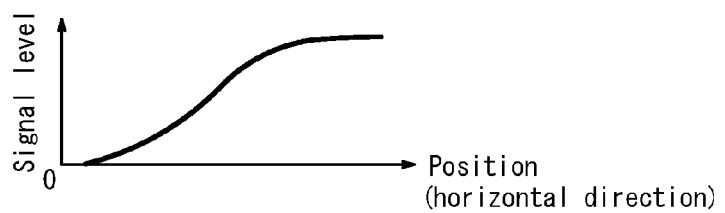
FIGS. 2A to 2D are diagrams illustrating a waveform of a signal level in a horizontal direction in association with sharpening processing.

FIG. 2A is a diagram illustrating the horizontal direction waveform of the signal level of the input image signal $S_{in}$, especially illustrating a portion of the waveform corresponding to the edge where the signal level changes in the horizontal direction. Note that resolution of the input image signal $S_{in}$ corresponds to that of an output image signal $S_{out}$. Therefore, when the resolution of an output image is higher than that of the input image originally input, it means that the input image signal $S_{in}$ is up-converted to have the resolution of the output image signal $S_{out}$. For example, when the image processing apparatus outputs an image of the SDTV as an image of the HDTV, the input image signal $S_{in}$ is converted to have the resolution of the HDTV by existing linear conversion carried out on the input image signal $S_{in}$ of the original image of the SDTV.

The HPF 10 removes at least a DC component of a frequency component contained in the input image signal $S_{in}$, and thus generates a first signal, which is a high frequency signal. In particular, the HPF 10 extracts a high frequency component containing an edge component of the image represented by the input image signal $S_{in}$ and also extracts a first signal S1 of FIG. 2B from the input image signal $S_{in}$ of FIG. 2A.

Figure 3:
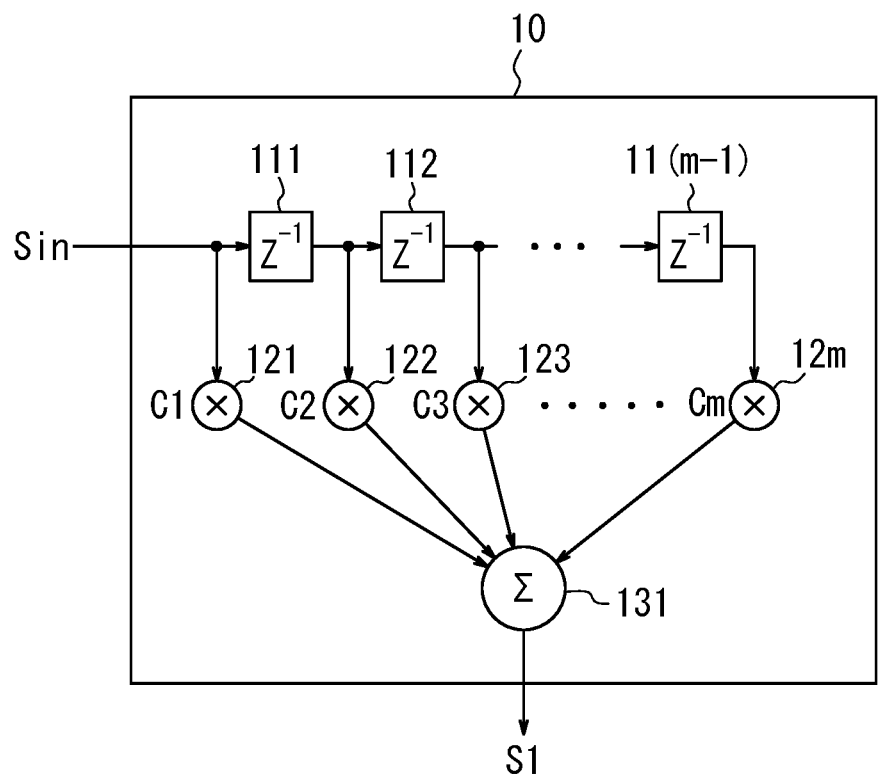
FIG. 3 is a diagram illustrating an example of a configuration of a high pass filter.
Figure 4:
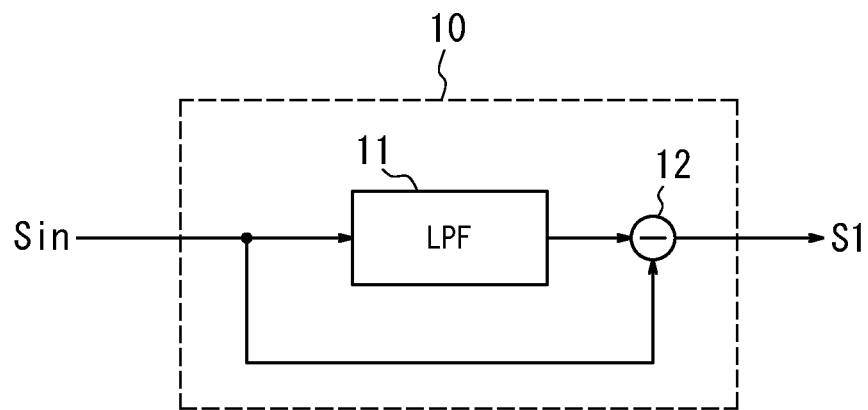
FIG. 4 is a diagram illustrating an example of the high pass filter having a low pass filter.

FIG. 3 is a block diagram illustrating a configuration of the HPF 10. As illustrated in FIG. 3, the HPF 10 may be constituted by using a transversal digital filter having m-number of taps (m is 3 or more) made up of m−1 number of unit delay elements 111 to 11(m−1), m-number of multipliers 121 to 12m, and one adder 131. In this case, each multiplier 12j (j=1 to m, the same applies hereinafter) multiplies the input signal by a coefficient Cj and outputs a result thus obtained to the adder 131. The coefficient Cj is set such that the HPF 10 extracts the high frequency component containing the outline component (for example, m=3, C1=0.5, C2=−1, and C3=0.5). In general, a low pass filter is substantialized more easily than a high pass filter. FIG. 4 is a diagram illustrating an example of the high pass filter that includes the low pass filter. As illustrated in FIG. 4, the HPF 10 illustrated in FIG. 1 may be substantialized by using a low pass filter (hereinafter, referred to as an "LPF") 11 and a subtractor 12.

Figure 2B:
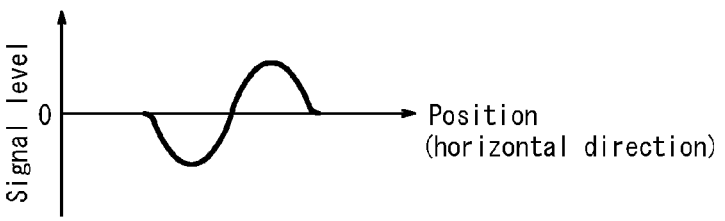

A nonlinear arithmetic unit 20 carries out, on the first signal S1, nonlinear processing represented by a continuous nonlinear function such that a second signal S2 passes through an origin, and thereby generates the second signal S2. Although this nonlinear processing may use a nonlinear function that is point symmetry with respect to the origin, the second signal S2 generated by carrying out the nonlinear processing that is asymmetric in the positive and negative regions of the first signal S1 enables sharpening processing corresponding to the human visual characteristic. The first signal S1, as illustrated in FIG. 2B, includes the edge component in the positive direction and the edge component in the negative direction.

Here, the nonlinear function that is asymmetric in the positive and negative regions will be described. The positive direction and the negative direction of the first signal S1 corresponds to a white direction and a black direction of a pixel, respectively. Applying different (asymmetric) nonlinear processing in both directions, rather than the same (symmetric) nonlinear processing, allows edge enhancement that is more appropriate for human visual characteristic. That is, the nonlinear arithmetic unit 20 may carry out different (asymmetric) nonlinear processing on the edge component in the positive direction of the first signal S1 and the edge component in the negative direction. Hereinafter, the nonlinear processing that is asymmetric in the positive direction and the negative direction of the first signal S1 will be particularly referred to as "asymmetric nonlinear processing". According to the disclosure herein, the nonlinear processing is not limited to the asymmetric nonlinear processing; however, the asymmetric nonlinear processing, rather than the processing using the nonlinear function that is symmetric with respect to the origin, enables visually natural sharpening processing.

Figure 2C:
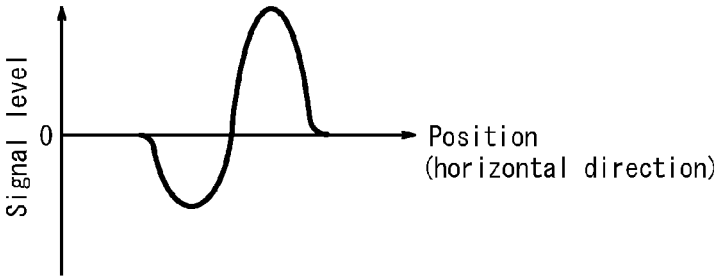
Figure 5:
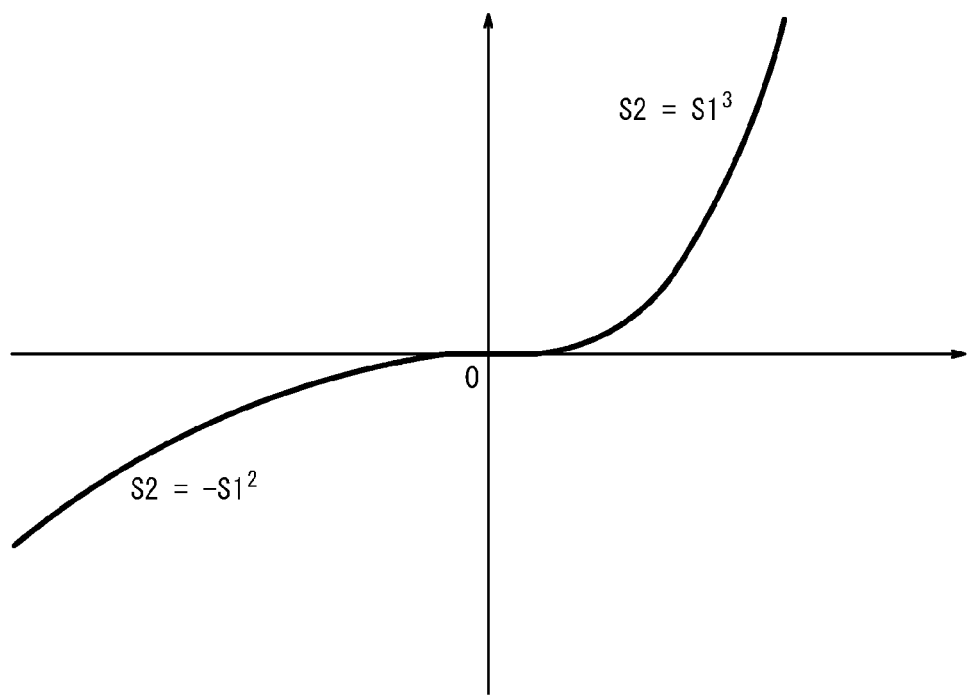
FIG. 5 is a diagram illustrating an example of asymmetric nonlinear processing.

The asymmetric nonlinear processing carried out by the nonlinear arithmetic unit 20 may be any combination of nonlinear processing as long as a value of the nonlinear processing applied to the positive region and a value of the nonlinear processing applied to the negative region are continuous around the origin (a point where the value is zero) of the first signal S1. The present embodiment assumes that the nonlinear arithmetic unit 20, as illustrated in FIG. 5, for example, generates the second signal S2 by raising the first signal S1 to the third power (S2=S1$^3$) when the first signal S1 is positive and by squaring the first signal S1 and adding a minus sign (S2=−S1$^2$) when the first signal S1 is negative. FIG. 2C is a diagram illustrating a waveform of the second signal S2 subjected to the asymmetric nonlinear processing carried out by the nonlinear arithmetic unit 20. As illustrated in the figure, the waveform in the positive region of the second signal S2 is significantly amplified. As described later, also, when the nonlinear processing that is asymmetric in the positive region and the negative region of the first signal S1 is carried out, a frequency component that is asymmetric in the positive region and the negative region may be generated.

When the nonlinear arithmetic unit 20 carries out the nonlinear processing that is asymmetric in the positive direction and the negative direction of the first signal S1, the image sharpening processing that matches human perception characteristics as described later may be substantialized. For example, Weber-Fechner law is known as a law based on the human sense. When this law is applied to image recognition, it can be said that an outline in a low luminance region (luminosity change) may be perceived more easily than an outline in a high luminance region. Therefore, the nonlinear arithmetic unit 20, for example, by carrying out processing having small amplification in the negative region of the first signal S1 on a region with a low signal level (luminance), may appropriately emphasize the edge component of the first signal S1 to allow perception of the outline, while suppressing noise in the low luminance region. Also, since the nonlinear arithmetic unit 20 significantly amplifies the waveform in the positive region such that the outline in the high luminance region is more sharpened, even when the edge component is very small before the nonlinear processing, the outline in the high luminance region may be easily perceived. In both regions, further, a high frequency component may be generated by the nonlinear processing.

Note that the asymmetric nonlinear processing carried out by the nonlinear arithmetic unit 20 is not limited to a combination of the square processing and the cube processing but may be nonlinear processing of another type. For example, the nonlinear processing carried out in the positive region and the negative region of the first signal S1 may be expressed by Formula (1). The nonlinear processing carried out by each arithmetic unit includes all of exponential multipliers of a general rational number represented by p/q. In such exponentiation arithmetic processing, whether the first signal S1 is positive or negative is to be maintained; for example, when even powers (e.g., square) is carried out as the exponentiation processing and the first signal S1 is negative, the sign of a value obtained from the exponentiation processing is maintained as negative (for example, $S2=-S1^2$).

[Formula 1]

$$S2 = S1^{\frac{p}{q}} \quad (1)$$

Also, the nonlinear arithmetic unit 20, for the asymmetric nonlinear processing, may use any appropriate combination of various nonlinear functions such as a trigonometric function (e.g., $S2=\text{Sin}(S1)$), a logarithmic function (e.g., $S2=\log(|S1|+1)$), and a gamma correction function (e.g., $S2=S1^{1/2}$).

Further, the nonlinear arithmetic unit 20 may carry out the nonlinear processing that does not use the general formula shown in Formula (1). For example, the nonlinear arithmetic unit 20 may preliminarily hold a table and the like of an addition value for each signal level of the first signal S1 and, for an 8-bit signal level that takes a value between a minimum value 0 and a maximum value 255, add a value within a range of ±10 according to the signal level of the first signal S1.

The limiter 30 functions as a regulator of the amplitude (the signal level) of the second signal S2 and, by adjusting the second signal S2, outputs the output image signal $S_{out}$. In particular, the limiter 30 carries out clipping for limiting the amplitude of the second signal S2 within a predetermined upper limit value, or gain adjustment of the level of the second signal S2 by multiplying the second signal S2 by a gain a ($0 \leq \alpha < 1$). The limiter 30, for noise removal, may also carry out a rounding operation for rounding off a signal value equal to or lower than a predetermined lower limit value to 0. The limiter 30 carries out the clipping, the gain adjustment, the rounding operation and the like on the second signal S2 and outputs the output image signal $S_{out}$ thus obtained.

Figure 2D:
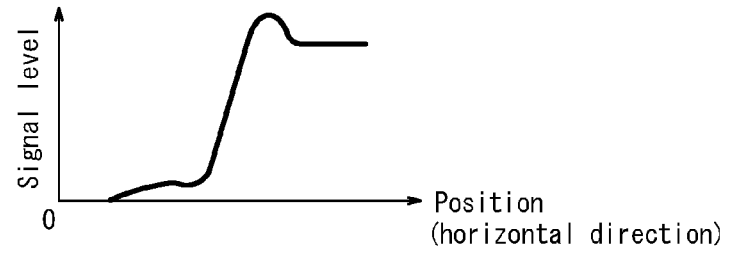

An adder (not shown) adds the output image signal $S_{out}$ illustrated in FIG. 2C as a compensation signal used for sharpening the image to the input image signal $S_{in}$ illustrated in FIG. 2A and thus generates a signal illustrated in FIG. 2D. The rise of the edge portion of this signal ($S_{in}+S_{out}$) is sharper than the rise of the edge portion of the input image signal $S_{in}$. That is, an image sharper than the image represented by the input image signal $S_{in}$ may be obtained.

(Example of Second Configuration of Sharpening Processing Unit)

Figure 6:
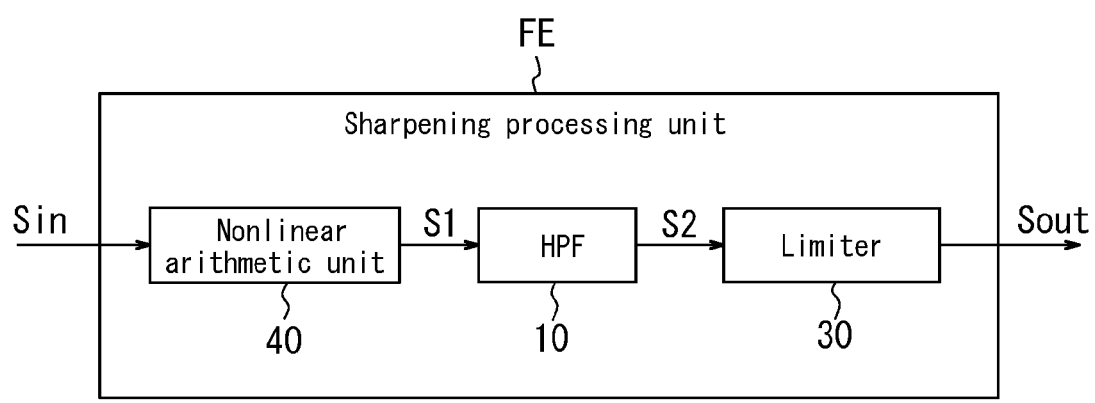
FIG. 6 is a diagram illustrating a second configuration of the sharpening processing unit of the disclosure herein.

FIG. 6 is a block diagram illustrating an example of a second configuration of the sharpening processing unit of the disclosure herein. This sharpening processing unit FE includes a nonlinear arithmetic unit 40 (a nonlinear function), the HPF 10, and the limiter 30. The following is, by using waveforms of a signal level (luminance) in the horizontal direction of an image illustrating in FIG. 7, a description of an operation of each unit and an output waveform. Note that each unit may carry out the sharpening processing similar to that for the horizontal direction of the image on a waveform of a signal level in the vertical direction of the image and a waveform of a signal level in a time direction between images of the video.

Figure 7A:
FIGS. 7A to 7D are diagrams illustrating the waveform of the signal level in the horizontal direction in association with the sharpening processing.

FIG. 7A is a diagram illustrating a waveform of a signal level in a horizontal direction of the input image signal $S_{in}$ and particularly illustrates a waveform of a portion corresponding to an edge where the signal level changes in the horizontal direction.

Figure 7B:
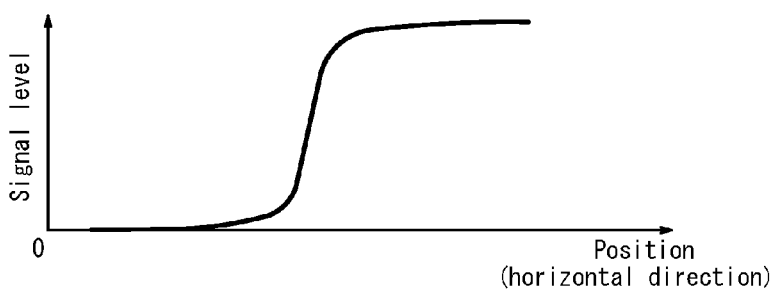

The nonlinear arithmetic unit 40 carries out the nonlinear arithmetic processing on the input image signal $S_{in}$ (or an input signal subjected to the nonlinear processing and the like) such that the first signal S1 is represented by the continuous nonlinear function and thus generates the first signal S1. The nonlinear arithmetic unit 40 carries out the nonlinear processing in order to sharpen the outline of the image; in particular, the nonlinear arithmetic unit 40 carries out the processing on the input image signal $S_{in}$ as illustrated in FIG. 7A so as to generate the first signal S1 as illustrated in FIG. 7B having sharp rise of the edge of the signal level.

The input image signal $S_{in}$ representing the input image contains a DC component which corresponds to the luminance level of the image. The nonlinear arithmetic unit 40 assigns the nonlinear function to the input image signal $S_{in}$ containing the DC component, and may thus simultaneously achieve both generation of a harmonic that is a frequency component not included in the input image signal $S_{in}$ and control of harmonic intensity according to the luminance level of the input image signal $S_{in}$.

The human eyes recognize the DC component of the input image signal $S_{in}$ as "brightness" of the image. When the input image signal $S_{in}$ containing the DC component is subjected to the nonlinear processing, since a generation degree of the harmonic differs based on the DC component, a frequency component for image quality improvement may be generated in a manner corresponding to the "brightness" of the image. Therefore, image enhancement processing corresponding to the human visual characteristics may be carried out.

The processing for generating the first signal S1 from the input image signal $S_{in}$ carried out by the nonlinear arithmetic unit 40 may be generalized by Formula (2). The nonlinear processing carried out by the nonlinear arithmetic unit 40 includes all of the exponential multipliers of the general rational number represented by p/q.

[Formula 2]

$$S1 = S_{in}^{\frac{p}{q}} \quad (2)$$

For example, the nonlinear arithmetic unit 40 generates the first signal S1 from a power of the input image signal $S_{in}$. When the nonlinear arithmetic unit 40 generates the first signal S1 by raising the input image signal $S_{in}$ to n, $S1=S_{in}^n$ is satisfied. Since the input image signal $S_{in}$ is the digital signal (a discrete signal), when, in particular, a data sequences constituting the input image signal $S_{in}$ is X1, X2, X3, . . . , the first signal S1 is a digital signal composed of a data sequence $X1^n$, $X2^n$, $X3^n$, . . . . Note that the n is any real number.

For example, when the input image signal $S_{in}$ is an 8-bit digital signal, the signal level of each pixel takes a value between 0 and 255. At this time, when the nonlinear arithmetic unit 40 squares the input image signal $S_{in}$, the rise of the edge portion becomes sharp as illustrated in FIG. 7B by way of example, and the outline of the image becomes more emphasized.

Or, the nonlinear arithmetic unit 40 generates the first signal S1 from, for example, a radical root of the input image signal $S_{in}$. When the nonlinear arithmetic unit 40 generates the first signal S1 from an n-th root of the input image signal $S_{in}$, $S1=S_{in}^{1/n}$ is satisfied. Since the input image signal $S_{in}$ is the digital signal (the discrete signal), when, in particular, the data sequence constituting the input image signal $S_{in}$ is X1, X2, X3, . . . , the first signal S1 is a digital signal composed of a data sequence $X1^{1/n}$, $X2^{1/n}$, $X3^{1/n}$, . . . . Note that the n is any real number.

The nonlinear arithmetic processing for generating the first signal S1 from the radical root of the input image signal $S_{in}$ is suitable for extraction of the outline based on the human perception characteristics. For example, Weber-Fechner law is known as a law based on the human sense. When this law is applied to image recognition, it can be said that an outline in a low luminance region (luminosity change) may be perceived more easily than an outline in a high luminance region. Therefore, for example, in order to emphasize a very small edge component in the low luminance region so as to allow the perception of the outline, the nonlinear arithmetic unit 40 carries out the nonlinear processing using, for example, a gamma correction function (for example, $S1=S_{in}^{1/2}$), thereby increasing the number of pixels with low luminance rather than the number of pixels with high luminance.

In this case, the nonlinear arithmetic unit 40, by using Formula (3), calculates X' that is a value obtained by normalization of a pixel value X of an m-bit digital signal. The X' after the normalization by using the Formula (3) takes a value between 0 and 1.

[Formula 3]

$$X' = \frac{X}{2^m} \quad (3)$$

Here, the nonlinear arithmetic unit 40, by adopting the gamma correction function shown in Formula (4) to the X' after the normalization, calculates a value Y after the nonlinear processing.

[Formula 4]

$$Y = X'^{\frac{1}{n}} \quad (4)$$

By the Formula (4), when the X' is small, the value Y after the nonlinear processing is increased to be higher than the X'. That is, the number of pixels with low luminance is increased more than the number of pixels with high luminance. Thereby, the edge sharpening as illustrated in FIG. 7B by way of example increases enhanced edge components particularly in the low luminance region, whereby the outline of the image especially in the low luminance region is more emphasized.

The HPF 10 removes at least the DC component of the frequency component contained in the first signal S1 and thus generates the second signal S2 serving as a high frequency signal. In particular, the HPF 10, in operation for extracting the high frequency component containing the outline component of the image obtained through the nonlinear processing carried out on the input image signal $S_{in}$, extracts the second signal S2 as illustrated in FIG. 7C from the first signal S1 as illustrated in FIG. 7B.

This sharpening processing unit carries out the nonlinear processing on the input image signal $S_{in}$ containing the DC component. Therefore, since an operation central point of the nonlinear processing of a signal for generating the harmonic changes according to the luminance level, the generation level of the harmonic changes according to the luminance level. Also, since a nonlinear curve viewed from the operation central point of the nonlinear processing differs between a high luminance side and a low luminance side, the harmonic signal that passes through the HPF 10 after subjected to the nonlinear processing becomes asymmetric in the positive region and the negative region. Therefore, appropriate sharpening processing corresponding to the human visual characteristics may be carried out.

The limiter 30 functions as an adjuster of amplitude (a signal level) of the second signal S2 and generates the output image signal $S_{out}$ by adjusting the second signal S2. The limiter 30 carries out the clipping, the gain adjustment, the rounding operation and the like on the second signal S2 and outputs the output image signal $S_{out}$ thus obtained.

Figure 7C:
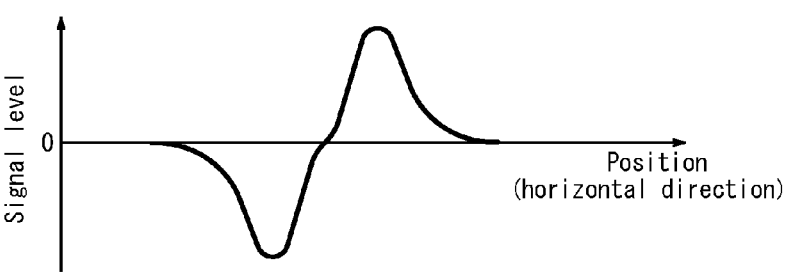
Figure 7D:

When the adder (not shown) adds the output image signal $S_{out}$ as illustrated in FIG. 7C as the compensation signal used for sharpening the image to the input image signal $S_{in}$ as illustrated in FIG. 7A, a signal as illustrated in FIG. 7D is generated. The raise of the edge portion of this signal ($S_{in}+S_{out}$) is sharper than the raise of the edge portion of the input image signal $S_{in}$. That is, an image sharper than that represented by the input image signal $S_{in}$ may be obtained.

The following is a detailed description of the image processing apparatus that includes the sharpening processing unit FE described above for sharpening frequency components in the horizontal direction (a lateral direction, a main scanning direction) and the vertical direction (a longitudinal direction, a sub-scanning direction) of the image. The input image signal $S_{in}$ of each embodiment has the sampling frequency fh in the horizontal direction, the sampling frequency fv in the vertical direction, the Nyquist frequency fh/2 in the horizontal direction, and the Nyquist frequency fv/2 in the vertical direction.

First Embodiment

FIG. 8 is a diagram illustrating an image processing apparatus 100 according to a first embodiment. The image processing apparatus 100 includes: a first nonlinear processing unit 101 for generating the first signal S1 by carrying out the nonlinear processing on the input image signal $S_{in}$; a sharpening processing block 102 for generating the second signal S2 by carrying out the sharpening processing in the horizontal direction and the vertical direction on the first signal S1; and a first adder 103 for generating the output image signal $S_{out}$ by adding the second signal S2 to the input image signal $S_{in}$. The sharpening processing block 102 includes a horizontal sharpening processing unit FEh, a vertical sharpening processing unit FEv, a second adder 104, and a third adder 105. The horizontal sharpening processing unit FEh and the vertical sharpening processing unit FEv are connected in series.

Figure 9:
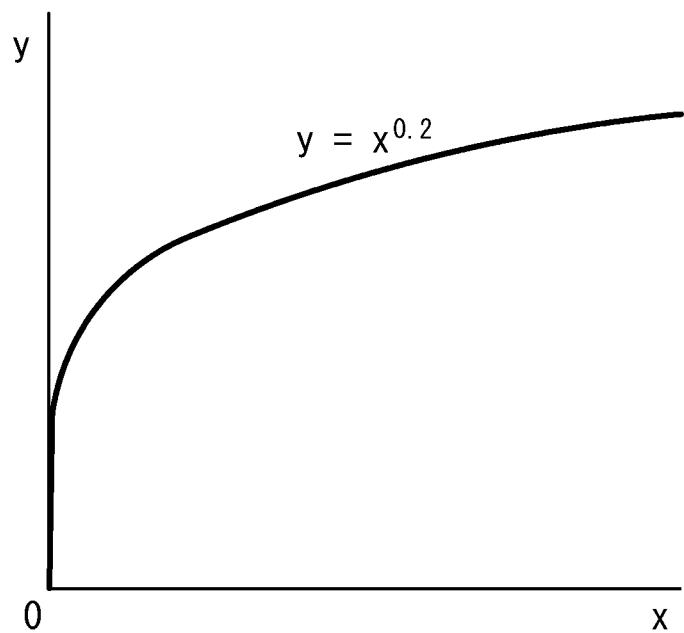
FIG. 9 is a diagram illustrating an example of nonlinear processing carried out by a nonlinear processing unit of the disclosure herein.

The first nonlinear processing unit 101 has a circuit configuration similar to that of the nonlinear arithmetic unit 40 described above and, by using, for example, an upward-convex nonlinear function passing through the origin, carries out the nonlinear processing on the input image signal $S_{in}$. FIG. 9 illustrates $y=x^{0.2}$ as an example of the upward-convex nonlinear function. The processing by using the upward-convex nonlinear function as described above carried out before the sharpening processing by the sharpening processing block 102 allows, when, for example, an image or a video with low contrast is input, the first nonlinear processing unit 101 to sharpen the contrast, whereby the sharpening processing block 102 at the subsequent stage may more effectively sharpen the image. Also, by using the upward-convex nonlinear function, a fine signal in a dark portion may be emphasized.

Note that the nonlinear processing carried out by the first nonlinear processing unit 101 is not limited to the upward-convex nonlinear function but may be a downward-convex nonlinear function. For example, when an image or a video with many noises is input, the first nonlinear processing unit 101 carries out nonlinear processing by using the downward-convex nonlinear function, thereby suppressing the noise.

As described above, since the first nonlinear processing unit 101 carries out the nonlinear processing at the preceding stage of the sharpening processing block 102, a degree of sharpening may be adjusted according to the luminance value of the input image signal $S_{in}$. The nonlinear function used by the first nonlinear processing unit 101 may be appropriately determined by those who are skilled in the art based on characteristics of the input image signal $S_{in}$.

The horizontal sharpening processing unit FEh generates a harmonic in the horizontal direction containing a frequency component higher than a frequency component in the horizontal direction contained in the input image signal $S_{in}$ (or an input signal subjected to the nonlinear processing and the like). The horizontal sharpening processing unit FEh carries out the sharpening processing on the first signal S1 received from the first nonlinear processing unit 101 and outputs a signal thus obtained to the second adder 104 and the third adder 105.

The third adder 105 combines the signal received from the first nonlinear processing unit 101 and the signal received from the horizontal sharpening processing unit FEh and outputs a signal thus obtained to the vertical sharpening processing unit FEv.

The vertical sharpening processing unit FEv generates a harmonic in the vertical direction containing a frequency component higher than a frequency component in the vertical direction contained in the input image signal $S_{in}$ (or the input signal subjected to the nonlinear processing or the like). The vertical sharpening processing unit FEv carries out the sharpening processing in the vertical direction of an image input from the third adder 105 and outputs a signal thus obtained to the second adder 104.

The second adder 104 combines the signal received from the horizontal sharpening processing unit FEh and the signal received from the vertical sharpening processing unit FEv and outputs a signal thus obtained to the first adder 103.

The first adder 103 generates the output image signal $S_{out}$ by combining the input image signal $S_{in}$ and the signal received from the second adder 104.

According to the present embodiment, as described above, the horizontal sharpening processing unit FEh may generate a frequency component in the horizontal direction in a wide range exceeding the Nyquist frequency fh/2, and the vertical sharpening processing unit FEv may generate a frequency component in the vertical direction in a wide range exceeding the Nyquist frequency fv/2. Thereby, the image may be sharpened.

Also, since the first nonlinear processing unit 101 is disposed at the preceding stage of the horizontal sharpening processing unit FEh and the vertical sharpening processing unit FEh and thus the nonlinear processing is carried out on the input image signal $S_{in}$ before the sharpening processing, the degree of the sharpening may be adjusted according to the luminance value of the input image signal $S_{in}$. Therefore, even when the input image signal represents a dark image or a low contrast image, the image sharpening may be more effectively carried out.

Also, since the image processing apparatus 100 according to the present embodiment may have a simple configuration as illustrated in FIG. 8, when the image processing apparatus 100 is used in a high definition television (HDTV) receiver, a standard definition television (SDTV) receiver and the like, image quality of a video being displayed in real time as well as image quality of a still image may be improved without causing a significant cost increase.

As being capable of compensating the high frequency domain exceeding the Nyquist frequency, the present embodiment is particularly effective in improving the image quality by sharpening an image represented by an image signal subjected to enlargement processing. For example, the present embodiment is greatly effective when a display of a high definition television (HDTV) receiver displays an image by carrying out the enlargement processing on an image signal of a standard definition television (SDTV), because the present embodiment is capable of, in a simple configuration, sufficiently sharpening a video being displayed in real time. Further, a display with approximately 4000×2000 pixels (hereinafter, referred to as a "4K display"), which has more pixels than the HDTV, and a technique for a television broadcast corresponding to the 4K display have been developed. When, also, the image signal of the HDTV is up-converted and displayed in the 4K display, the present embodiment is greatly effective in a similar aspect.

Note that, in the image processing apparatus 100, the order of the sharpening processing in the horizontal direction and the sharpening processing in the vertical direction may be altered. That is, the input image signal $S_{in}$ may be processed by altering the order of the horizontal sharpening processing unit FEh and the vertical sharpening processing unit FEv.

In the image processing apparatus 100, also, instead of disposing the first nonlinear processing unit 101 at the preceding stage of the sharpening processing block 102, the nonlinear processing unit may be disposed at the preceding stage of the horizontal sharpening processing unit FEh and the preceding stage of the vertical sharpening processing unit FEv.

Exemplary Variation of First Embodiment

Figure 10A:
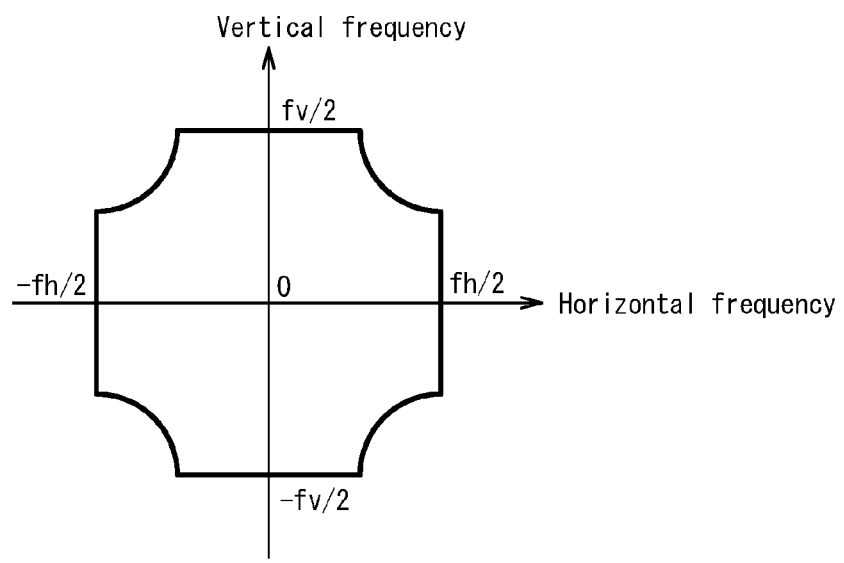
FIGS. 10A and 10B are diagrams illustrating examples of frequency characteristics of a two-dimensional LPF.
Figure 10B:
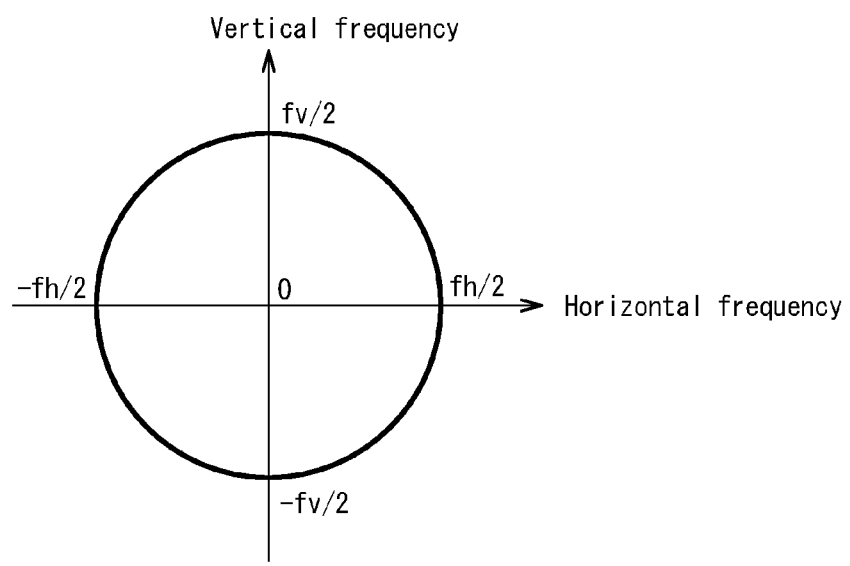

In the image processing apparatus 100 according to the first embodiment illustrated in FIG. 8, a two-dimensional LPF may be disposed at a preceding stage of the first nonlinear processing unit 101. FIG. 10 are diagrams illustrating examples of frequency characteristics of the two-dimensional LPF. As illustrated in these figures, the two-dimensional LPF is characteristic in attenuating high frequency components in the horizontal direction and the vertical direction of the input image signal $S_{in}$. In order to effectively suppress the glittering of the image as described below, the two-dimensional LPF, as illustrated in FIG. 10A, preferably attenuates high frequency components in the horizontal direction and high frequency components in the vertical direction. Also, when the image processing apparatus 100 uses a two-dimensional HPF described later, the two-dimensional LPF preferably has high-frequency range cutoff characteristics in all directions as illustrated in FIG. 10B. However, a straight line or other high-frequency range cutoff shapes also has an effect of suppressing the glittering.

As described in the first embodiment, when the sharpening processing for generating high frequency components exceeding the Nyquist frequencies is continuously carried out in the horizontal direction and the vertical direction, since the sharpening processing is carried out in an overlapping manner in a range at high frequencies in both the horizontal direction and the vertical direction, a diagonal line in the image, for example, may glitter. The following is a description of a situation like that with reference to FIG. 11.

Figure 11A:
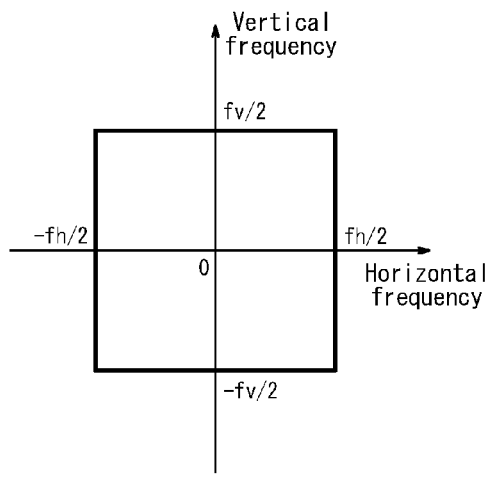
FIG. 11A to 11C are diagrams illustrating changes of frequency components caused by the sharpening processing.
Figure 11B:
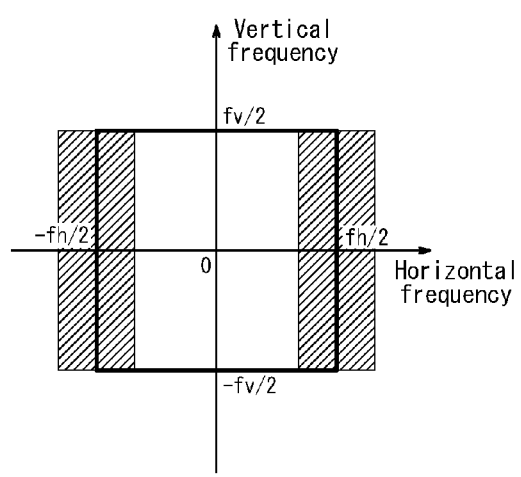
Figure 11C:
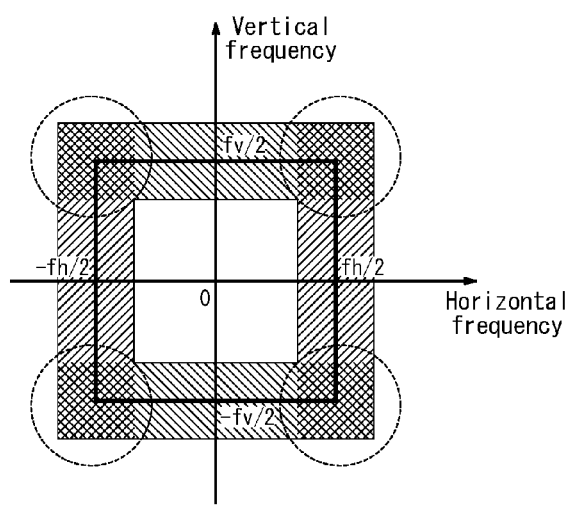

FIG. 11A illustrates a frequency component of the input image signal $S_{in}$ of a digital image with the sampling frequency fh in the horizontal direction and the sampling frequency fv in the vertical direction. When the sharpening processing is carried out in the horizontal direction of the input image signal $S_{in}$, as indicated by hatched regions in FIG. 11B, frequency components are generated in regions exceeding the Nyquist frequency fh/2 in the horizontal direction. When the signal is further subjected to the sharpening processing in the vertical direction, as indicated by the hatched regions in FIG. 11C, frequency components are generated also in regions exceeding the Nyquist frequency fv/2 in the vertical direction of the output image signal $S_{out}$ after the sharpening processing. In this case, since the regions at high frequencies in both the horizontal direction and the vertical direction are subjected to the sharpening processing in the overlapping manner, the glittering of the image is emphasized.

When the two-dimensional LPF is disposed at the preceding stage of the first nonlinear processing unit 101, the frequency regions at high frequencies in both the horizontal direction and the vertical direction those subjected to the sharpening processing in the overlapping manner may be attenuated, whereby the glittering of the image caused by the sharpening processing carried out in the overlapping manner may be suppressed.

Also, since the two-dimensional LPF reduces noise components, disposing the two-dimensional LPF at the preceding stage of the first nonlinear processing unit 101 has an effect of preventing the sharpening processing from being carried out on the noise components.

Also, in a main line in which the input image signal $S_{in}$ is directly input to the first adder 103, instead of that the input image signal $S_{in}$ is directly input to the first adder 103, the nonlinear processing unit may be disposed at the preceding stage of the first adder 103 such that the input image signal $S_{in}$ is subjected to the nonlinear processing before being input to the first adder 103.

In this case, since the main line holds a DC to the end, the second nonlinear processing unit 107 preferably carries out nonlinear processing that brightens a dark portion in the input image signal $S_{in}$. For example, an upward-convex function passing through the origin such as from $y=x^{0.1}$ to $y=x^{0.99}$ is preferable. Although the second nonlinear processing unit 107 may use a nonlinear function the same as that of the first nonlinear processing unit 101, in order to obtain optimum output image characteristics, the second nonlinear processing unit 107 may independently adjust by using a different nonlinear function.

As described above, when the second nonlinear processing unit 107 is disposed at the preceding stage of the first adder 103, the fine signal in the dark portion may be emphasized, and the contrast may be sharpened.

Figure 12:
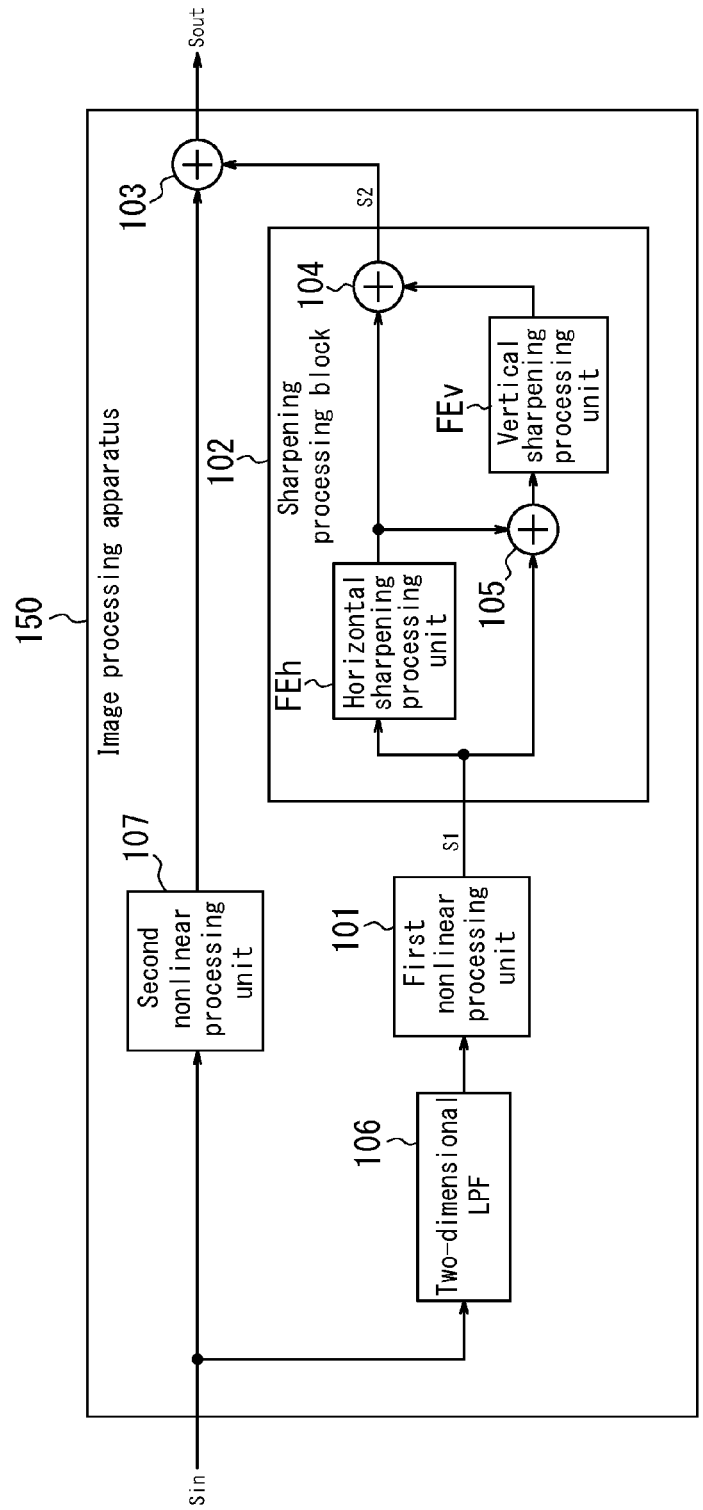
FIG. 12 is a diagram illustrating a configuration of an image processing apparatus according to an exemplary variation of the first embodiment.

FIG. 12 illustrates a configuration of an image processing apparatus 150 according to a variation of the first embodiment, in which the image processing apparatus 100 of the first embodiment further includes a two-dimensional LPF 106 at the preceding stage of the first nonlinear processing unit 101 and a second nonlinear processing unit 107 added to the main line.

Note that the two-dimensional LPF 106 may be disposed at the subsequent stage of the first nonlinear processing unit 101. Also, in place of the two-dimensional LPF 106, an LPF in the horizontal direction (a horizontal LPF) and an LPF in the vertical direction (a vertical LPF) may be used. In this case, the vertical LPF is disposed immediately before the horizontal sharpening processing unit FEh, and the horizontal sharpening processing unit is disposed immediately before the vertical sharpening processing unit FEv, thereby more effectively suppressing the glittering of the image.

Also, although in FIG. 12 the first nonlinear processing unit 101 and the second nonlinear processing unit 107 are individual nonlinear processing units, the first nonlinear processing unit 101 and the second nonlinear processing unit 107 may be constituted by using a common nonlinear processing unit which outputs to the sharpening processing block 102 and the first adder 103. In this case, the two-dimensional LPF 106 may be disposed at the preceding stage of the common nonlinear processing unit, or the input image signal $S_{in}$ may be directly input to the common nonlinear processing unit. Or, the input image signal $S_{in}$ may be directly input to the common nonlinear processing unit, and the two-dimensional LPF 106 may be disposed between the common nonlinear processing unit and the sharpening processing block 102.

Second Embodiment

Figure 13:
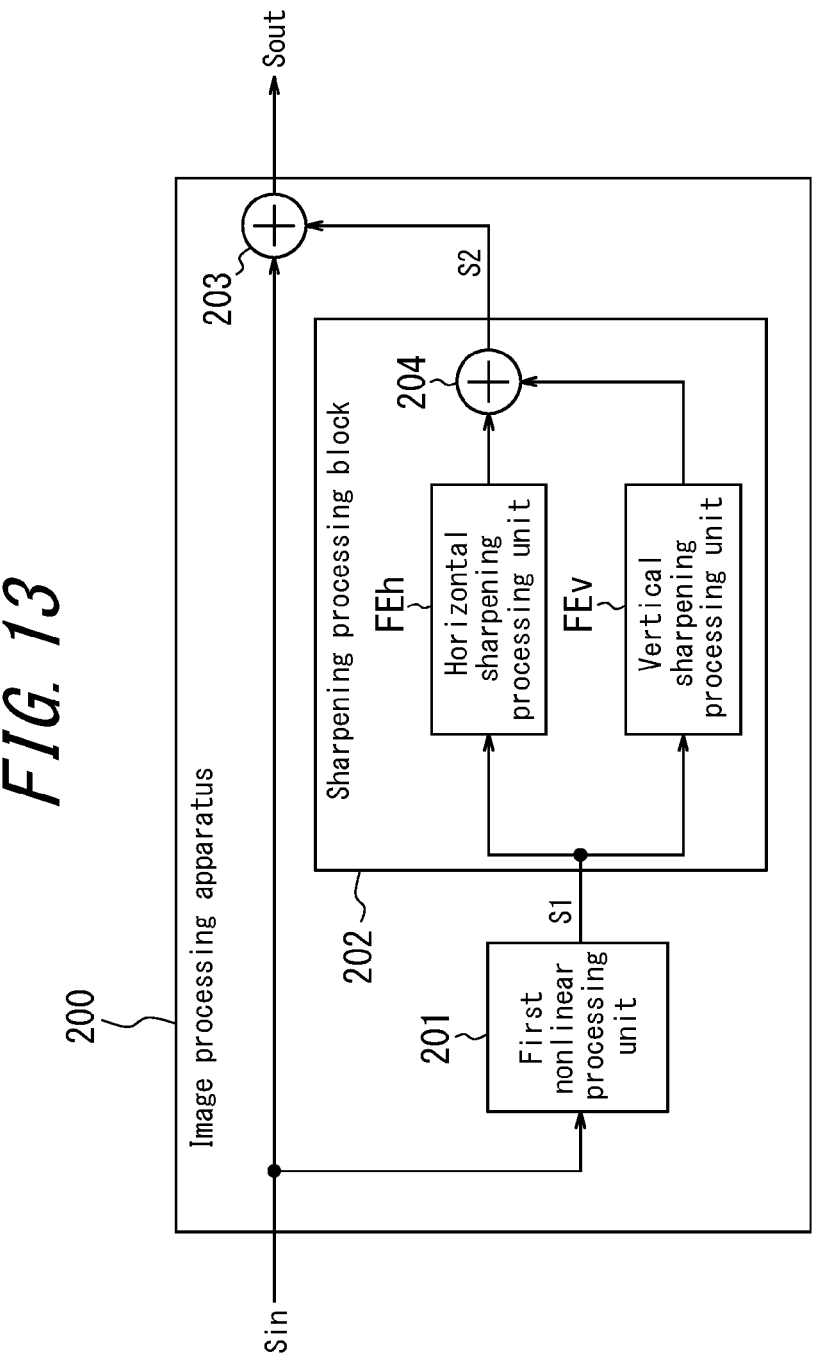
FIG. 13 is a diagram illustrating a configuration of an image processing apparatus according to a second embodiment.

FIG. 13 is a diagram illustrating a configuration of an image processing apparatus 200 according to a second embodiment. The image processing apparatus 200 includes a first nonlinear processing unit 201 for generating the first signal S1 by carrying out the nonlinear processing on the input image signal $S_{in}$, a sharpening processing block 202 for generating the second signal S2 by carrying out the sharpening processing on the first signal S1 in the horizontal direction and the vertical direction, and a first adder 203 for generating the output image signal $S_{out}$ by adding the second signal S2 to the input image signal $S_{in}$. The sharpening processing block 202 includes the horizontal sharpening processing unit FEh, the vertical sharpening processing unit FEv, and a second adder 204, and the horizontal sharpening processing unit FEh and the vertical sharpening processing unit FEv are connected in parallel. In the following description of each functional block, descriptions the same as those of the first embodiment will be omitted.

The first nonlinear processing unit 201, by using, for example, the upward-convex nonlinear function passing through the origin, carries out the nonlinear processing on the input image signal $S_{in}$.

The horizontal sharpening processing unit FEh generates the harmonic in the horizontal direction containing the frequency component higher than the frequency component in the horizontal direction contained in the input image signal $S_{in}$ (or the input signal subjected to the nonlinear processing or the like). The horizontal sharpening processing unit FEh carries out the sharpening processing on the first signal S1 received from the first nonlinear processing unit 201 and outputs a signal thus obtained to the second adder 204.

The vertical sharpening processing unit FEv generates the harmonic in the vertical direction containing the frequency component higher than the frequency component in the vertical direction contained in the input image signal $S_{in}$ (or the input signal subjected to the nonlinear processing or the like). The vertical sharpening processing unit FEv carries out the sharpening processing on the first signal S1 received from the first nonlinear processing unit 201 and outputs a signal thus obtained to the second adder 204.

The second adder 204 combines the signal received from the horizontal sharpening processing unit FEh and the signal received from the vertical sharpening processing unit FEv and outputs a signal thus obtained to the first adder 203.

The first adder 203 generates the output image signal $S_{out}$ by combining the input image signal $S_{in}$ and the signal received from the second adder 204.

In the image processing apparatus 200, instead of disposing the first nonlinear processing unit 201 at the preceding stage of the sharpening processing block 202, the nonlinear processing unit may be disposed at the preceding stage of the horizontal sharpening processing unit FEh and the preceding stage of the vertical sharpening processing unit FEv.

In the image processing apparatus 200, also, the two-dimensional LPF may be disposed at the preceding stage or the subsequent stage of the first nonlinear processing unit 201. Or, in place of the two-dimensional LPF, the LPF in the horizontal direction (the horizontal LPF) and the LPF in the vertical direction (the vertical LPF) may be disposed.

In the image processing apparatus 200, also, in the main line in which the input image signal $S_{in}$ is directly input to the first adder 203, instead of that the input image signal $S_{in}$ is directly input to the first adder 203, the nonlinear processing unit (the second nonlinear processing unit 107 set forth above) may be disposed at the preceding stage of the first adder 203 such that the input image signal $S_{in}$ is subjected to the nonlinear processing before being input to the first adder 203.

Third Embodiment

Figure 14:
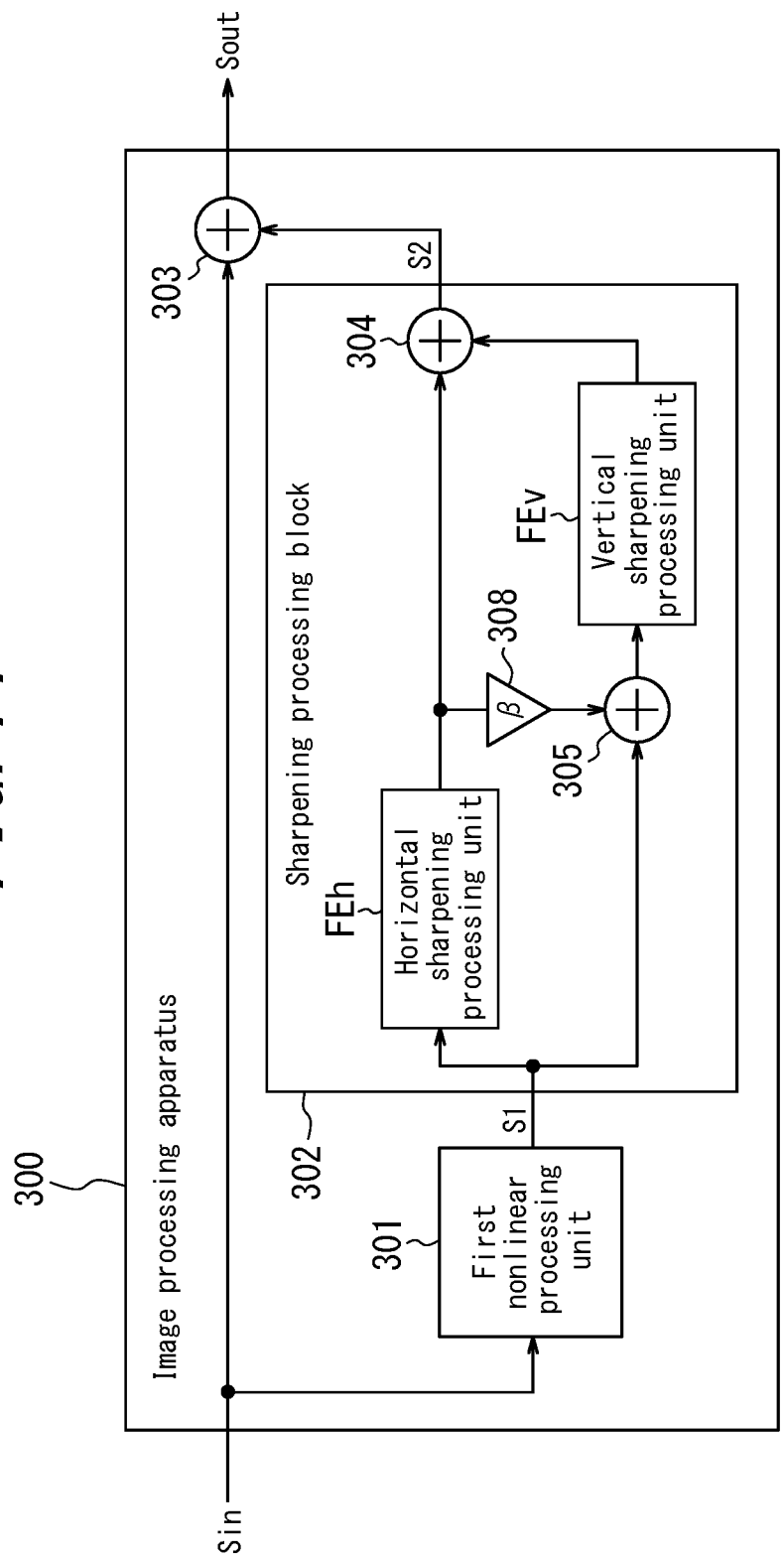
FIG. 14 is a diagram illustrating a configuration of an image processing apparatus according to a third embodiment.

FIG. 14 is a diagram illustrating a configuration of an image processing apparatus 300 according to a third embodiment. The image processing apparatus 300 includes a first nonlinear processing unit 301 for generating the first signal S1 by carrying out the nonlinear processing on the input image signal $S_{in}$, a sharpening processing block 302 for generating the second signal S2 by carrying out the sharpening processing on the first signal S1 in the horizontal direction and the vertical direction, and a first adder 303 for generating the output image signal $S_{out}$ by adding the second signal S2 to the input image signal $S_{in}$. The sharpening processing block 302 includes the horizontal sharpening processing unit FEh, the vertical sharpening processing unit FEv, a second adder 304, a third adder 305, and an amplifier 308. In the sharpening processing block 302, a switch unit (the amplifier 308) is connected to a subsequent stage of the horizontal sharpening processing unit FEh and a preceding stage of the vertical sharpening processing unit FEv. The amplifier 308 serving as the switch unit, based on a setting of an amplification factor β, changes between parallel connection and series connection of the horizontal sharpening processing unit FEh and the vertical sharpening processing unit FEv. In the following description of each functional block, descriptions the same as those of the first embodiment will be omitted.

The first nonlinear processing unit 301, by using, for example, the upward-convex nonlinear function passing through the origin, carries out the nonlinear processing on the input image signal $S_{in}$.

The horizontal sharpening processing unit FEh generates the harmonic in the horizontal direction containing the frequency component higher than the frequency component in the horizontal direction contained in the input image signal $S_{in}$ (or the input signal subjected to the nonlinear processing or the like). The horizontal sharpening processing unit FEh carries out the sharpening processing on the first signal S1 received from the first nonlinear processing unit 301 and outputs a signal thus obtained to the second adder 304 and the amplifier 308.

The amplifier 308 amplifies the signal received from the horizontal sharpening processing unit FEh with the amplification factor β and outputs a signal thus obtained to the third adder 305. When the amplification factor β is 0, the image processing apparatus 300 has a configuration in which the horizontal sharpening processing unit FEh and the vertical sharpening processing unit FEv are connected in parallel. On the other hand, when the amplification factor β is 1, the image processing apparatus 300 has a configuration in which the horizontal sharpening processing unit FEh and the vertical sharpening processing unit FEv are connected in series. When the amplification factor β satisfies $0<\beta<1$, a frequency component caused by series processing and a frequency component caused by parallel processing are generated. Therefore, by setting the amplification factor β according to the characteristics of the input image signal $S_{in}$, the frequency component caused by the series processing and the frequency component caused by the parallel processing are combined, whereby the sharpening processing may be carried out more appropriately.

The third adder 305 combines the first signal S1 received from the first nonlinear processing unit 301 and the signal received from the amplifier 308 and outputs a signal thus obtained to the vertical sharpening processing unit FEv.

The vertical sharpening processing unit FEv generates the harmonic in the vertical direction containing the frequency component higher than the frequency component in the vertical direction contained in the input image signal $S_{in}$ (or the input image subjected to the nonlinear processing and the like). The vertical sharpening processing unit FEv carries out the sharpening processing in the vertical direction of the image input from the third adder 305 and outputs a signal thus obtained to the second adder 304.

The second adder 304 combines the signal received from the horizontal sharpening processing unit FEh and the signal received from the vertical sharpening processing unit FEv and outputs a signal thus obtained to the first adder 303.

The first adder 303 generates the output image signal $S_{out}$ by combining the input image signal $S_{in}$ and the signal received from the second adder 304.

Note that in the image processing apparatus 300 the order of the horizontal direction sharpening processing and the vertical direction sharpening processing may be altered.

In the image processing apparatus 300, also, instead of disposing the first nonlinear processing unit 301 at the preceding stage of the sharpening processing block 302, the nonlinear processing unit may be disposed at the preceding stage of the horizontal sharpening processing unit FEh and the preceding stage of the vertical sharpening processing unit FEv.

In the image processing apparatus 300, also, the two-dimensional LPF may be disposed at the preceding stage or the subsequent stage of the first nonlinear processing unit 301. Or, in place of the two-dimensional LPF, the LPF in the horizontal direction (the horizontal LPF) and the LPF in the vertical direction (the vertical LPF) may be disposed.

In the image processing apparatus 300, further, in the main line in which the input image signal $S_{in}$ is directly input to the first adder 303, instead of that the input image signal $S_{in}$ is directly input to the first adder 303, the nonlinear processing unit (the second nonlinear processing unit 107 set forth above) may be disposed at the preceding stage of the first adder 303 such that the input image signal $S_{in}$ is subjected to the nonlinear processing before being input to the first adder 303.

Fourth Embodiment

Figure 15:
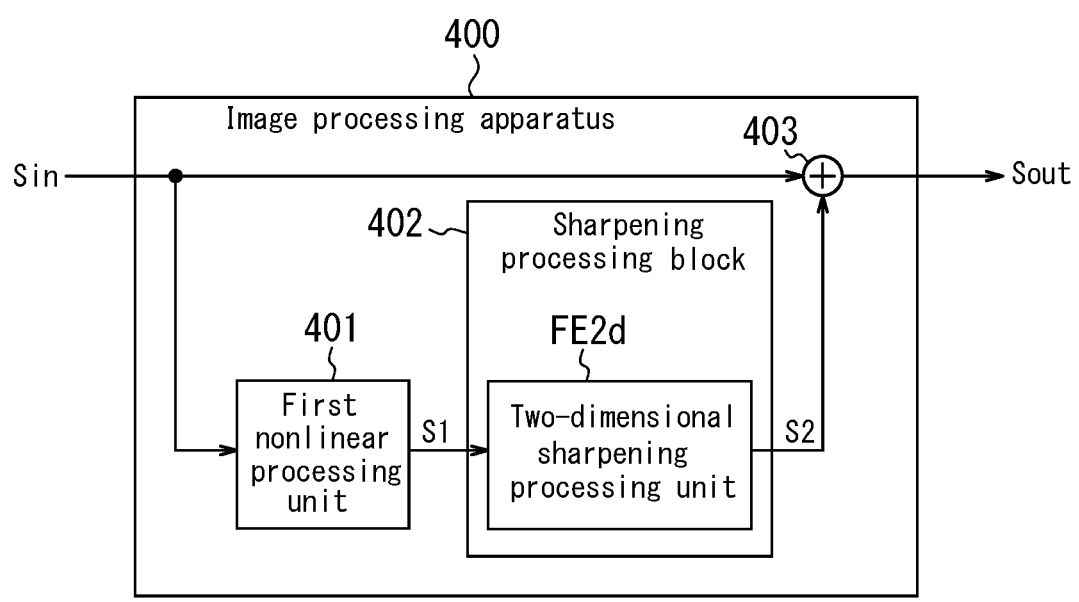
FIG. 15 is a diagram illustrating a configuration of an image processing apparatus according to a fourth embodiment.

FIG. 15 is a diagram illustrating a configuration of an image processing apparatus 400 according to a fourth embodiment. The image processing apparatus 400 includes a first nonlinear processing unit 401 for generating the first signal S1 by carrying out the nonlinear processing on the input image signal $S_{in}$, a sharpening processing block 402 for generating the second signal S2 by carrying out the sharpening processing on the first signal S1 in the horizontal direction and the vertical direction, and a first adder 403 for generating the output image signal $S_{out}$ by adding the second signal S2 to the input image signal $S_{in}$. The sharpening processing block 402 includes, in place of the horizontal sharpening processing unit FEh and the vertical sharpening processing unit FEv, a two-dimensional sharpening processing unit FE2d. In the following description of each functional block, descriptions the same as those of the first embodiment will be omitted.

The first nonlinear processing unit 401, by using, for example, the upward-convex nonlinear function passing through the origin, carries out the nonlinear processing on the input image signal $S_{in}$.

The two-dimensional sharpening processing unit FE2d generates the harmonic in the horizontal direction containing the frequency component higher than the frequency component in the horizontal direction contained in the input image signal $S_{in}$ (or the input signal subjected to the nonlinear processing or the like) and the harmonic in the vertical direction containing the frequency component higher than the frequency component in the vertical direction contained in the input image signal $S_{in}$ (or the input signal subjected to the nonlinear processing or the like). The two-dimensional sharpening processing unit FE2d carries out the sharpening processing on the first signal S1 received from the first nonlinear processing unit 401 and outputs a signal thus obtained to the first adder 403. The two-dimensional sharpening processing unit FE2d will be described in detail later.

The first adder 403 generates the output image signal $S_{out}$ by combining the input image signal $S_{in}$ and the signal received from the two-dimensional sharpening processing unit FE2d.

Figure 16:
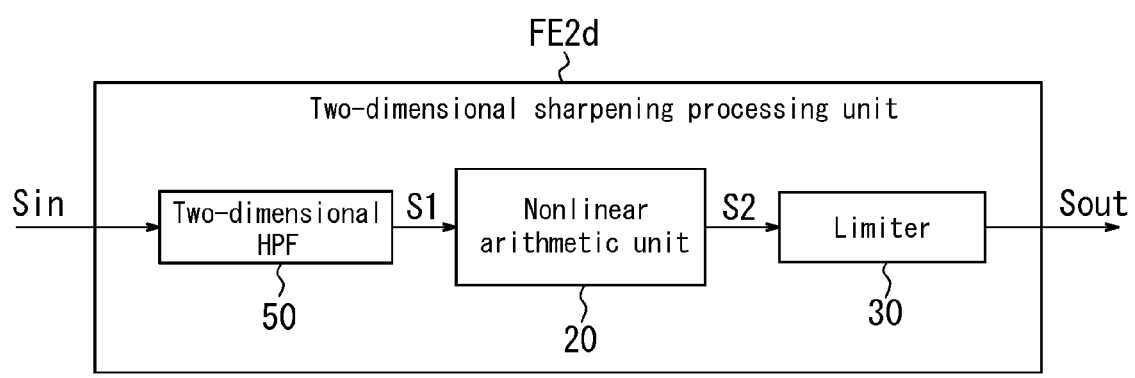
FIG. 16 is a diagram illustrating a configuration of a sharpening processing unit that uses a two-dimensional HPF according to the disclosure herein.

FIG. 16 is a block diagram illustrating an example of a configuration of the two-dimensional sharpening processing unit FE2d. The two-dimensional sharpening processing unit FE2d carries out, on the input image signal $S_{in}$ (or the input signal subjected to the nonlinear processing or the like), processing for sharpening the image represented by the input image signal $S_{in}$ and includes a two-dimensional HPF 50, the nonlinear arithmetic unit 20, and the limiter 30. An order of the functional blocks may be; the two-dimensional HPF 50, the nonlinear arithmetic unit 20, and the limiter 30 are arranged in the stated order as those in the sharpening processing unit FE illustrated in FIG. 1, or the nonlinear arithmetic unit 20, the two-dimensional HPF 50, and the limiter 30 are arranged in the stated order as those in the sharpening processing unit FE illustrated in FIG. 6.

FIG. 17 illustrate examples of a change in the frequency component caused by the sharpening processing when the two-dimensional HPF is disposed before the nonlinear arithmetic unit.

Figure 17A:
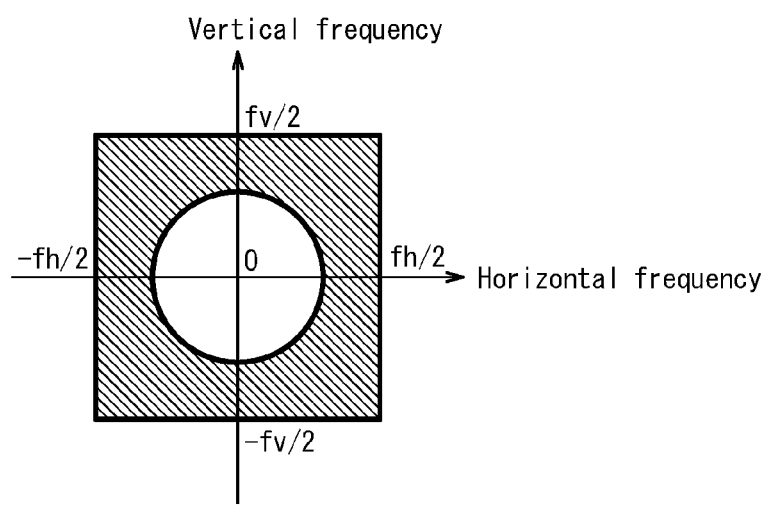
FIGS. 17A and 17B are diagrams illustrating a change in the frequency component caused by the sharpening processing that uses the two-dimensional HPF.

FIG. 17(A) illustrates frequency components of the first signal S1 after the input image signal $S_{in}$ of the digital image with the sampling frequency fh in the horizontal direction and the sampling frequency fv in the vertical direction passes through the two-dimensional HPF 50. A hatched region represents the frequency components having passed through the two-dimensional HPF 50. A region at a low frequency represents frequency components those do not pass through the two-dimensional HPF 50.

Figure 17B:
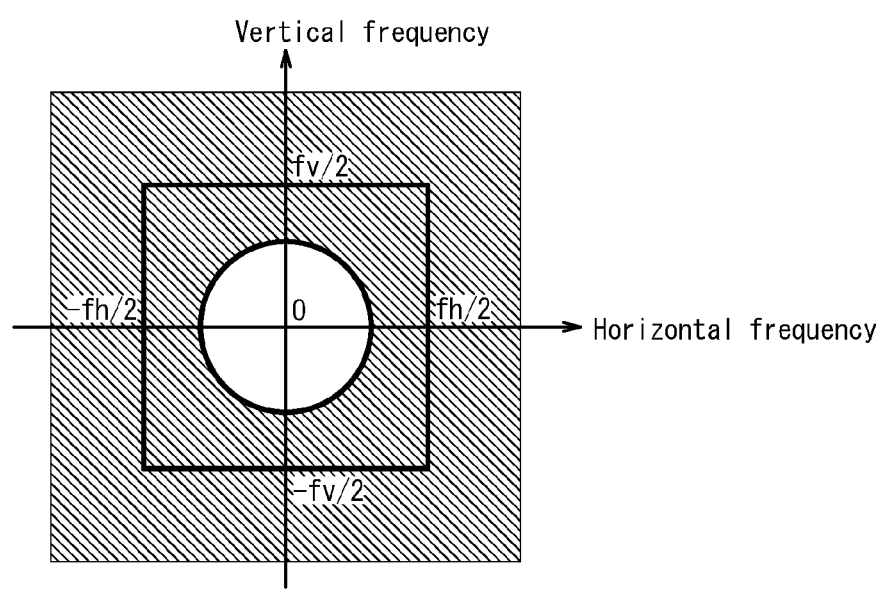

FIG. 17B illustrates frequency components of the second signal S2 after passing through the nonlinear arithmetic unit 20. As indicated by a hatched region in FIG. 17B, frequency components are generated in regions exceeding the Nyquist frequency fh/2 in the horizontal direction and the Nyquist frequency fv/2 in the vertical direction. As can be seen in the figure, since the two-dimensional sharpening processing unit FE2d may generate, by carrying out the sharpening processing one time, the frequency components in regions exceeding the Nyquist frequency fh/2 in the horizontal direction and the Nyquist frequency fv/2 in the vertical direction, the glitter of the image caused by the sharpening processing carried out in the overlapping manner may be suppressed.

According to the present embodiment, also, in place of the two lines of the horizontal direction sharpening processing and the vertical direction sharpening processing, one line of the two-dimensional sharpening processing unit FE2d may be provided. Therefore, the number of times of the nonlinear arithmetic may be reduced and, as a result, a circuit volume may be reduced.

In the image processing apparatus 400, also, the two-dimensional LPF may be disposed at the preceding stage or the subsequent stage of the first nonlinear processing unit 401.

In the image processing apparatus 400, further, in the main line in which the input image signal $S_{in}$ is directly input to the first adder 403, instead of that the input image signal $S_{in}$ is directly input to the first adder 403, the nonlinear processing unit (the second nonlinear processing unit 107 set forth above) may be disposed at the preceding stage of the first adder 403 such that the input image signal $S_{in}$ is subjected to the nonlinear processing before being input to the first adder 403.

Fifth Embodiment

Figure 18:
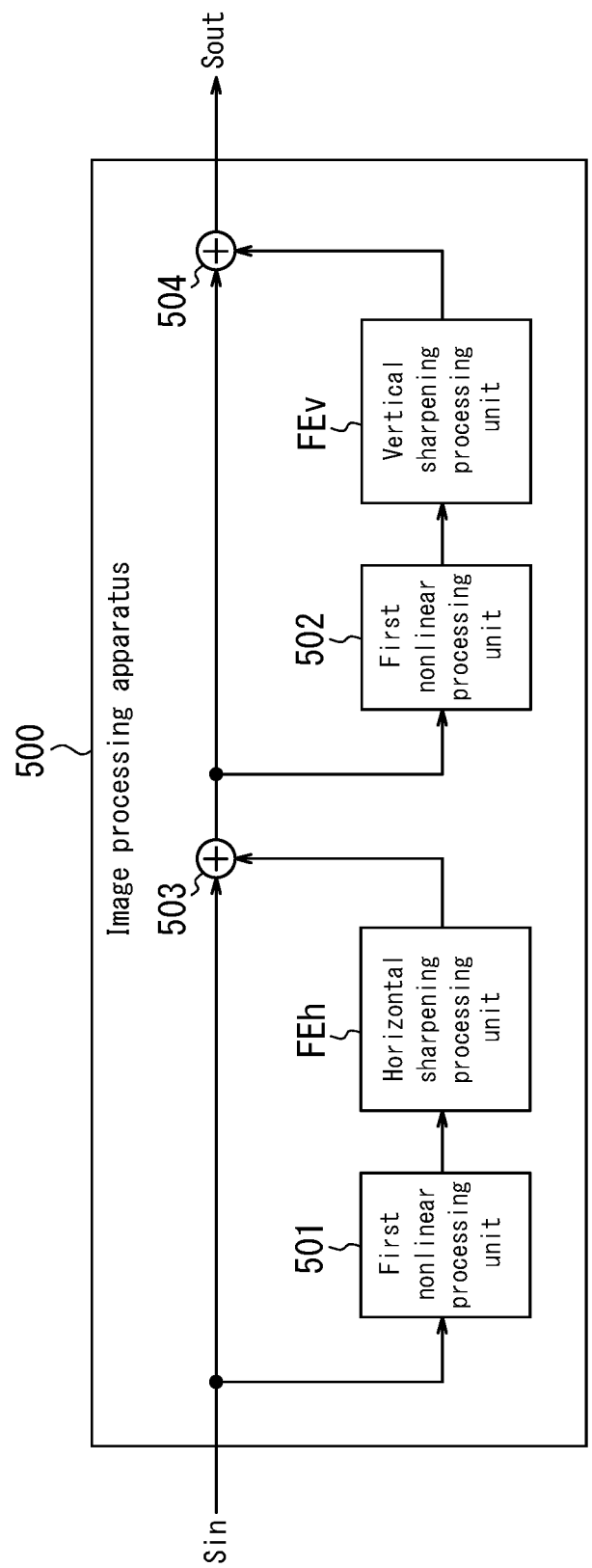
FIG. 18 is a diagram illustrating a configuration of an image processing apparatus according to a fifth embodiment.
Figure 19A:
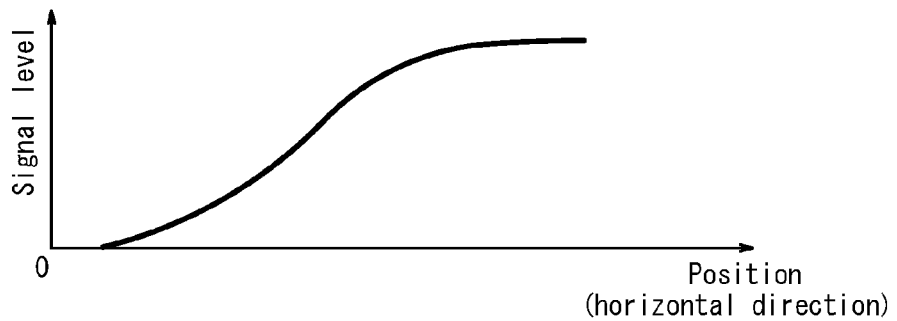
FIGS. 19A to 19C are diagrams illustrating changes of the waveform of the signal level of the image caused by conventional image enhancement processing.
Figure 19B:
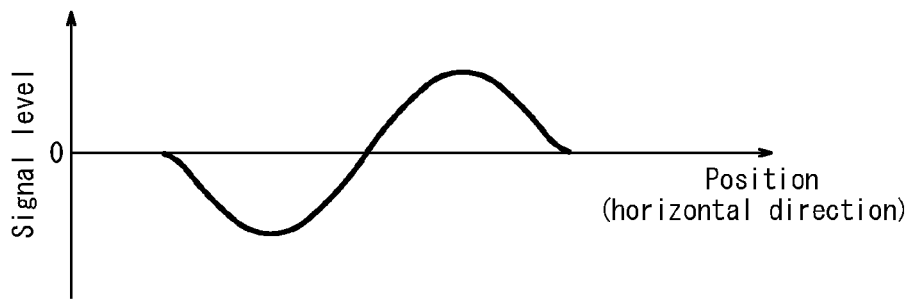
Figure 19C:
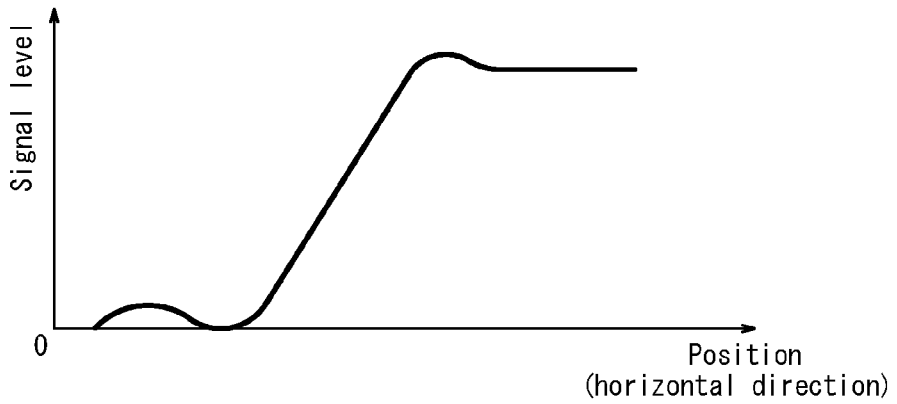
Figure 20A:
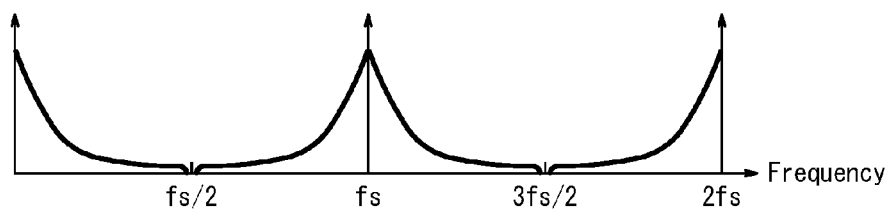
FIGS. 20 A to 20D are diagrams illustrating changes of the frequency component caused by enlargement processing and enhancement processing of an image.
Figure 20B:
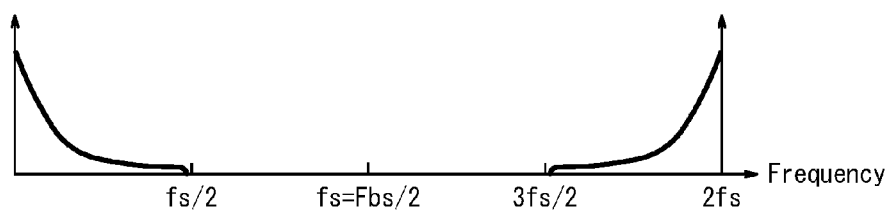
Figure 20C:
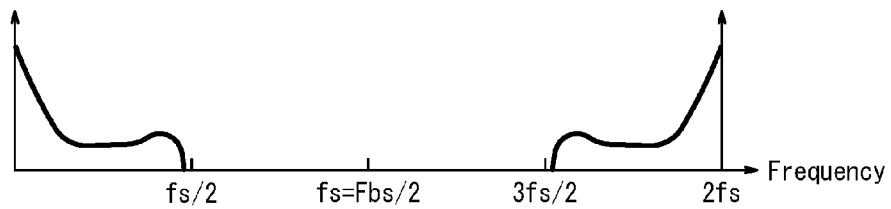
Figure 20D:
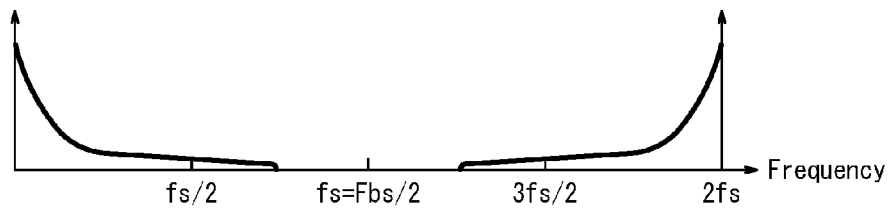

FIG. 18 is a diagram illustrating a configuration of an image processing apparatus 500 according to a fifth embodiment. The image processing apparatus 500 includes first nonlinear processing units 501 and 502, the horizontal sharpening processing unit FEh, the vertical sharpening processing unit FEv, a first adder 503, and a second adder 504. In the image processing apparatus 500, the horizontal sharpening processing unit FEh and the vertical sharpening processing unit FEv are connected in series. In the following description of each functional block, descriptions the same as those of the first embodiment will be omitted.

The first nonlinear processing unit 501, by using, for example, the upward-convex nonlinear function passing through the origin, carries out the nonlinear processing on the input image signal $S_{in}$.

The horizontal sharpening processing unit FEh generates the harmonic in the horizontal direction containing the frequency component higher than the frequency component in the horizontal direction contained in the input signal. The horizontal sharpening processing unit FEh carries out the sharpening processing on a signal received from the first nonlinear processing unit 501 and outputs a signal thus obtained to the first adder 503.

The first adder 503 combines the input image signal $S_{in}$ and the signal received from the horizontal sharpening processing unit FEh and outputs a signal thus obtained to the second adder 504 and the first nonlinear processing unit 502.

The first nonlinear processing unit 502 carries out the nonlinear processing on the signal received from the first adder 503 and outputs a signal thus obtained to the vertical sharpening processing unit FEv.

The vertical sharpening processing unit FEv generates the harmonic in the vertical direction containing the frequency component higher than the frequency component in the vertical direction contained in the input signal. The vertical sharpening processing unit FEv carries out the sharpening processing on the signal received from the first nonlinear processing unit 502 and outputs a signal thus obtained to the second adder 504.

The second adder 504 generates the output image signal $S_{out}$ by combining the signal received from the first adder 503 and the signal received from the vertical sharpening processing unit FEv.

Note that in the image processing apparatus 500 an order of the horizontal direction sharpening processing and the vertical direction sharpening processing may be altered.

In the image processing apparatus 500, also, the two-dimensional LPF may be disposed at the preceding stages or the subsequent stages of the first nonlinear processing units 501 and 502. Or, in place of the two-dimensional LPF, the LPF in the horizontal direction (the horizontal LPF) and the LPF in the vertical direction (the vertical LPF) may be disposed.

In the image processing apparatus 500, further, the vertical LPF may be disposed before the first nonlinear processing unit 501 at the preceding stage of the horizontal sharpening processing unit FEh, and the horizontal LPF may be disposed before the first nonlinear processing unit 502 at the preceding stage of the vertical sharpening processing unit FEv.

INDUSTRIAL APPLICABILITY

The disclosure herein is intended to be applied to the image enhancement apparatus for improving image quality by sharpening an image, and applicable to, for example, the image enhancement apparatus for sharpening the video that is displayed in real time on a television (TV) receiver.

The disclosure herein is applicable also to image enhancement processing of a monitoring camera and, for example, capable of reducing blur in an enlarged portion of an image. Also, our image processing apparatus and image processing method allow for the image enhancement processing for sharpening an outline in a region with low brightness in an image captured by the monitoring camera installed in a dark position, or in an image taken at night.

The disclosure herein is applicable also to resolution enhancement of an image captured from a distance. For example, an image of an accident site difficult to access taken from a distance, or a satellite image may be processed with the image enhancement processing for sharpening the outline.

The disclosure herein is applicable also to high-definition conversion of analog contents. That is, in order to convert existing analog contents into high-definition contents, the image enhancement processing for sharpening the outline of the up-converted image is carried out. Thereby, the analog contents may be reproduced as digital contents with higher definition. Our image processing apparatus and image processing method are applicable to, for example, conversion of the analog television contents into high-resolution contents, and conversion of contents of an old movie into digital contents with higher definition (for example, contents of Blu-ray® (Blu-ray is a registered trademark in Japan, other countries, or both)).

Also, the disclosure herein is applicable to a medical field. For example, our image processing apparatus and image processing method allow for conversion of an enlarged image of an affected site taken by an endoscope or the like into an image with higher definition image, or conversion of an image of an affected site with low resolution into an image with higher definition in the remote medical care.

Further, the disclosure herein applicable to higher-definition conversion of video contents that can be viewed on a computer. On the internet, there are a number of websites for distributing video contents, and numerous video contents have already been stored. The disclosure herein allows for enlargement of the image of existing video contents and conversion of the contents into contents with higher definition and higher resolution, thereby improving viewing quality.

Although the present disclosure has been described based on the figures and the embodiments, it is to be understood that various modifications and changes may be implemented based on the present disclosure by those who are ordinarily skilled in the art. Accordingly, such modifications and changes are included in a scope of the present disclosure. For example, functions and the like included in each unit and each step may be rearranged without logical inconsistency, so as to combine a plurality of units or steps together or to divide them. Also, although the apparatus has been mainly described as the disclosure herein, a method executed by a processor of the apparatus, a program, and a storage medium storing the program may also substantialize the disclosure herein and thus are included in the scope of the disclosure herein.

REFERENCE SIGNS LIST

100, 150, 200, 300, 400, 500 image processing apparatus
10 HPF
111 to 11(*m*−1) unit delay element
121 to 12*m* multiplier
131 adder
11 LPF
12 subtractor
20, 40 nonlinear arithmetic unit
30 limiter
101, 201, 301, 401, 501, 502 first nonlinear processing unit
102, 202, 302, 402 sharpening processing block 103, 203, 303, 403, 503 first adder
104, 204, 304, 504 second adder
105, 305 third adder
106 two-dimensional LPF
107 second nonlinear processing unit
308 amplifier
FEh horizontal sharpening processing unit
FEv vertical sharpening processing unit
FE2d two-dimensional sharpening processing unit

The invention claimed is:

1. An image processing apparatus for generating an output image by sharpening an input image, comprising:
   a first nonlinear processing unit configured to generate a first signal by carrying out nonlinear processing on an input image signal representing the input image by using an upward-convex nonlinear function;
   a sharpening processing block configured to generate a second signal containing a frequency component higher than a frequency component contained in the first signal by carrying out sharpening processing having nonlinear arithmetic on the first signal; and
   an adder configured to generate an output image signal representing the output image by adding the second signal to the input image signal.

2. The image processing apparatus according to claim 1, wherein the sharpening processing block having:
   a horizontal sharpening processing unit configured to generate a harmonic in a horizontal direction containing a frequency component higher than a frequency component in the horizontal direction contained in the input image signal; and
   a vertical sharpening processing unit configured to generate a harmonic in a vertical direction containing a frequency component higher than a frequency component in the vertical direction contained in the input image signal, wherein
   the horizontal sharpening processing unit and the vertical sharpening processing unit are connected in series or in parallel.

3. The image processing apparatus according to claim 2, wherein at least one of the horizontal sharpening processing unit and the vertical sharpening processing unit has:
   a filter configured to remove at least a DC component of a frequency component contained in an input signal;
   a nonlinear arithmetic unit configured to carry out, on an output signal of the filter, nonlinear processing that is asymmetric in a positive region and a negative region of the output signal of the filter, the nonlinear processing applied to the positive region and the nonlinear processing applied to the negative region being represented by a continuous function passing through an origin, such that a band of frequency components generated by the nonlinear processing becomes asymmetric in the positive region and the negative region; and
   a limiter configured to adjust an output signal of the nonlinear arithmetic unit.

4. The image processing apparatus according to claim 2, wherein at least one of the horizontal sharpening processing unit and the vertical sharpening processing unit has:
   a nonlinear arithmetic unit configured to carry out nonlinear processing on an input signal, such that an output signal of the nonlinear arithmetic unit to the input signal is represented by a continuous nonlinear function and a frequency component not contained in the input signal is generated;
   a filter configured to remove at least a DC component of a frequency component contained in the output signal of the nonlinear arithmetic unit; and
   a limiter configured to adjust an output signal of the filter.

5. The image processing apparatus according to claim 2, further comprising an amplifier connected to a subsequent stage of one of the horizontal sharpening processing unit and the vertical sharpening processing unit and a preceding stage of the other.

6. The image processing apparatus according to claim 5, wherein an amplification factor $\beta$ of the amplifier satisfies $0 \leq \beta \leq 1$.

7. The image processing apparatus according to claim 1, wherein
   the sharpening processing block has:
   a two-dimensional HPF configured to remove at least a DC component of frequency components in a horizontal direction and a vertical direction contained in the input image signal;
   a nonlinear arithmetic unit configured to carry out, on an output signal of the two-dimensional HPF, nonlinear processing that is asymmetric in a positive region and a negative region of the output signal of the two-dimensional HPF, the nonlinear processing applied to the positive region and the nonlinear processing applied to the negative region being represented by a continuous function passing through an origin, such that a band of frequency components generated by the nonlinear processing becomes asymmetric in the positive region and the negative region; and
   a limiter configured to adjust an output signal of the nonlinear arithmetic unit.

8. The image processing apparatus according to claim 1, wherein
   the sharpening processing block has:
   a nonlinear arithmetic unit configured to carry out nonlinear processing on an input image signal, such that an output signal of the nonlinear arithmetic unit to the input image signal is represented by a continuous nonlinear function and a frequency component not contained in the input image signal is generated;
   a two-dimensional HPF configured to remove at least a DC component of frequency components in a horizontal direction and a vertical direction contained in an output signal of the nonlinear arithmetic unit; and
   a limiter configured to adjust an output signal of the two-dimensional HPF.

9. The image processing apparatus according to claim 1, further comprising a second nonlinear processing unit configured to carry out nonlinear processing on the input image signal representing the input image, wherein
   the adder generates an output image signal representing the output image by adding the second signal to a signal processed by the second nonlinear processing unit.

10. The image processing apparatus according to claim 1, further comprising a two-dimensional LPF at a preceding stage or a subsequent stage of the first nonlinear processing unit.

11. An image processing apparatus for generating an output image by sharpening an input image, comprising:
    a horizontal direction processing unit having: a first nonlinear processing unit configured to carry out nonlinear processing on an input signal by using an upward-convex nonlinear function; a horizontal sharpening processing unit disposed at a subsequent stage of the first nonlinear processing unit, the horizontal sharpening processing unit configured to generate a harmonic in a horizontal direction containing a frequency component higher than a frequency component in the horizontal direction contained in the input signal by carrying out sharpening processing having horizontal direction nonlinear arithmetic; and a first adder configured to combine the input signal to the first nonlinear processing unit disposed at a preceding stage of the horizontal sharpening processing unit and an output signal of the horizontal sharpening processing unit; and a vertical direction processing unit having: a first nonlinear processing unit configured to carry out nonlinear processing on the input signal by using the upward-convex nonlinear function; a vertical sharpening processing unit disposed at a subsequent stage of the first nonlinear processing unit, the vertical sharpening processing unit configured to generate a harmonic in a vertical direction containing a frequency component higher than a frequency component in the vertical direction contained in the input signal by carrying out sharpening processing having vertical direction nonlinear arithmetic; and a second adder configured to combine the input signal to the first nonlinear processing unit disposed at a preceding stage of the vertical sharpening processing unit and an output signal of the vertical sharpening processing unit, wherein the horizontal direction processing unit and the vertical direction processing unit are connected in series to process an input image signal.

12. An image processing method of an image processing apparatus for generating an output image by sharpening an input image, wherein procedure performed by the image processing apparatus has:

(a) a step of generating a first signal by carrying out nonlinear processing on an input image signal representing the input image by using an upward-convex function;

(b) a step of generating a second signal containing a frequency component higher than a frequency component contained in the first signal by carrying out sharpening processing having nonlinear arithmetic on the first signal; and (c) a step of generating an output image signal representing the output image by adding the second signal to the input image signal.

13. The image processing method according to claim 12, wherein the step (b) has:

a horizontal direction processing step of generating a harmonic in a horizontal direction containing a frequency component higher than a frequency component in the horizontal direction contained in the input image signal; and a vertical direction processing step of generating a harmonic in a vertical direction containing a frequency component higher than a frequency component in the vertical direction contained in the input image signal, wherein the horizontal direction processing step and the vertical direction processing step are carried out in series or in parallel.

14. The image processing method according to claim 13, wherein at least one of the horizontal direction processing step and the vertical direction processing step has:

a DC component removal step of generating a signal by removing at least a DC component of a frequency component contained in an input signal;

a nonlinear processing step of generating a signal by carrying out, on the signal generated at the DC component removal step, nonlinear processing that is asymmetric in a positive region and a negative region of the signal generated at the DC component removal step, the nonlinear processing applied to the positive region and the nonlinear processing applied to the negative region being represented by a continuous function passing through an origin, such that a band of frequency components generated by the nonlinear processing becomes asymmetric in the positive region and the negative region; and an adjustment step of generating a signal by adjusting the signal generated at the nonlinear processing step.

15. The image processing method according to claim 13, wherein at least one of the horizontal direction processing step and the vertical direction processing step has:

a nonlinear processing step of generating a signal by carrying out nonlinear processing on an input signal, such that the signal generated at the nonlinear processing step to the input signal is represented by a continuous nonlinear function and a frequency component not contained in the input signal is generated;

a DC component removal step of generating a signal by removing at least a DC component of a frequency component contained in the signal generated at the nonlinear processing step; and a step of generating a signal by adjusting the signal generated at the DC component removal step.

16. The image processing method according to claim 13, comprising a step of adjusting, based on an amplification factor β, a ratio to select between series execution and parallel execution of the horizontal direction processing step and the vertical direction processing step.

17. The image processing method according to claim 16, wherein the amplification factor β satisfies 0≤β≤1.

18. The image processing method according to claim 12, wherein the step (b) has:

a DC component removal step of removing at least a DC component of frequency components in a horizontal direction and a vertical direction contained in the input image signal;

a nonlinear processing step of generating a signal by carrying out, on a signal generated at the DC component removal step, nonlinear processing that is asymmetric in a positive region and a negative region of the signal generated at the DC component removal step, the nonlinear processing applied to the positive region and the nonlinear processing applied to the negative region being represented by a continuous function passing through an origin, such that a band of frequency components generated by the nonlinear processing becomes asymmetric in the positive region and the negative region; and an adjustment step of generating a signal by adjusting the signal generated at the nonlinear processing step.

19. The image processing method according to claim 12, wherein the step (b) has:

a nonlinear processing step of generating a signal by carrying out nonlinear processing on the input image signal, such that the signal generated at the nonlinear processing step to the input image signal is represented by a continuous nonlinear function and a frequency component not contained in the input image signal is generated;

a DC component removal step of generating a signal by removing at least a DC component of frequency components in a horizontal direction and a vertical direction contained in the signal generated at the nonlinear processing step; and a step of generating a signal by adjusting the signal generated at the DC component removal step.

20. The image processing method according to claim 12, further comprising a step (d) of carrying out the nonlinear processing on the input image signal representing the input image, wherein the step (c) generates the output image signal representing the output image by adding the second signal to a signal generated at the step (d).

21. The image processing method according to claim 12, wherein the step (a) carries out the nonlinear processing after passing the input image signal through a two-dimensional LPF.

* * * * *

UNITED STATES PATENT AND TRADEMARK OFFICE
CERTIFICATE OF CORRECTION

PATENT NO. : 9,734,563 B2  
APPLICATION NO. : 14/913802  
DATED : August 15, 2017  
INVENTOR(S) : Seiichi Gohshi et al.

Page 1 of 1

It is certified that error appears in the above-identified patent and that said Letters Patent is hereby corrected as shown below:

In the Specification

Column 11, Line 53, please delete "a gain a ($0 \leq \alpha < 1$)" and insert --a gain $\alpha$ ($0 \leq \alpha < 1$)--.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*